US010435805B2

(12) United States Patent
Markou et al.

(10) Patent No.: US 10,435,805 B2
(45) Date of Patent: Oct. 8, 2019

(54) TWO-STAGE METHOD FOR DIP-COATING ELECTRICALLY CONDUCTIVE SUBSTRATES USING A BI (III)-CONTAINING COMPOSITION

(71) Applicants: BASF Coatings GmbH, Muenster (DE); HENKEL AG & Co. KGaA, Duesseldorf (DE)

(72) Inventors: Konstantinos Markou, Cologne (DE); Christian Hammer, Duesseldorf (DE); Kristof Wapner, Duesseldorf (DE); Florian Gaspar, Solingen (DE)

(73) Assignees: BASF Coatings GmbH, Muenster (DE); Henkel AG & Company, KGaA, Duesseldorf (DE)

( * ) Notice: Subject to any disclaimer, the term of this patent is extended or adjusted under 35 U.S.C. 154(b) by 116 days.

(21) Appl. No.: 15/037,365

(22) PCT Filed: Nov. 18, 2013

(86) PCT No.: PCT/EP2013/074102
§ 371 (c)(1),
(2) Date: May 18, 2016

(87) PCT Pub. No.: WO2015/070929
PCT Pub. Date: May 21, 2015

(65) Prior Publication Data
US 2016/0298250 A1    Oct. 13, 2016

(51) Int. Cl.
| | |
|---|---|
| C25D 5/02 | (2006.01) |
| C25D 5/48 | (2006.01) |
| C25D 9/02 | (2006.01) |
| C25D 7/00 | (2006.01) |
| C09D 5/44 | (2006.01) |
| C25D 3/54 | (2006.01) |
| C09D 7/40 | (2018.01) |
| C09D 7/63 | (2018.01) |
| C08K 5/092 | (2006.01) |

(52) U.S. Cl.
CPC .............. *C25D 5/02* (2013.01); *C09D 5/443* (2013.01); *C09D 5/448* (2013.01); *C09D 5/4411* (2013.01); *C09D 7/40* (2018.01); *C09D 7/63* (2018.01); *C25D 3/54* (2013.01); *C25D 5/48* (2013.01); *C25D 7/00* (2013.01); *C25D 9/02* (2013.01); *C08K 5/092* (2013.01)

(58) Field of Classification Search
None
See application file for complete search history.

(56) References Cited

U.S. PATENT DOCUMENTS

| | | | |
|---|---|---|---|
| 5,554,700 A | 9/1996 | Schipfer et al. | |
| 6,353,057 B1 | 3/2002 | He et al. | |
| 6,872,765 B1 * | 3/2005 | Betz | B05D 7/536 524/236 |
| 8,702,943 B2 * | 4/2014 | December | C08G 59/186 204/504 |
| 8,937,117 B2 * | 1/2015 | Nakazawa | C09D 175/04 523/402 |
| 2005/0234149 A1 | 10/2005 | Grosse-Brinkhaus et al. | |
| 2007/0027238 A1 | 2/2007 | Grosse-Brinkhaus et al. | |

(Continued)

FOREIGN PATENT DOCUMENTS

| | | |
|---|---|---|
| CN | 1079236 A | 12/1993 |
| CN | 1346859 A | 5/2002 |
| CN | 101144174 A | 3/2008 |
| DE | 35 18 732 A1 | 11/1986 |
| DE | 35 18 770 A1 | 11/1986 |
| DE | 102 36 347 A1 | 2/2004 |
| DE | 10 2008 016 220 A1 | 10/2009 |
| EP | 0 004 090 A2 | 9/1979 |
| EP | 0 012 463 A1 | 6/1980 |
| EP | 0 505 445 B1 | 11/1994 |

(Continued)

OTHER PUBLICATIONS

Combined Office Action and Search Report dated Jun. 28, 2017 in Chinese Patent Application No. 201380080991.2, (with English Translation).

(Continued)

*Primary Examiner* — Kishor Mayekar
(74) *Attorney, Agent, or Firm* — Oblon, McClelland, Maier & Neustadt, L.L.P.

(57) ABSTRACT

The present invention relates to a method for at least partly coating an electrically conductive substrate with an electrocoat material, comprising at least contacting the substrate with an aqueous coating composition (A) as step (1), which is carried out in at least two successive stages (1a) and (1b), i.e., first at an applied voltage in a range from 1 to 50 V (1a), which is applied over a duration of at least 5 seconds, and then in a range from 50 to 400 V (1b), the voltage applied in (1b) being greater by at least 10 V than the voltage applied in (1a), with (A) comprising at least one cathodically depositable binder (A1), at least one organic monocarboxylic or polycarboxylic acid which has no nitrogen atom(s), and/or anions thereof (A3) and trivalent bismuth (A4), with (A3) and (A4) each being present in (A) in an amount such that their stoichiometry to one another allows at least 50 mol % of (A4) to be present in the form of a salt and/or complex of components (A3) and (A4), with the molar fractions of any zirconium ions and aminopolycarboxylic acids present in (A) to be lower by a factor in each case of 100 or of 15, respectively, than the molar fraction of (A4) present in (A); to a use of (A) for at least partly coating the substrate with an electrocoat material; to at least partly coated electrically conductive substrates obtainable by the method; and to articles or components produced from such substrates.

16 Claims, No Drawings

(56) References Cited

U.S. PATENT DOCUMENTS

2008/0254283 A1* 10/2008 Shimoda ............... C25D 13/18
428/336

FOREIGN PATENT DOCUMENTS

| EP | 1 000 985 A1 | 5/2000 |
| EP | 1 889 952 A1 | 2/2003 |
| EP | 0 961 797 B1 | 4/2003 |
| EP | 1 192 226 B1 | 6/2005 |
| EP | 1 884 579 A1 | 2/2008 |
| EP | 1 889 952 A1 | 2/2008 |
| EP | 2 405 035 A1 | 1/2012 |
| JP | 2002-538283 A | 11/2002 |
| JP | 2011-57944 A | 3/2011 |
| WO | 82/00148 A1 | 1/1982 |
| WO | 93/24578 A2 | 12/1993 |
| WO | 95/07319 A1 | 3/1995 |
| WO | 00/34398 A1 | 6/2000 |
| WO | 00/47642 A1 | 8/2000 |
| WO | 03/074618 A1 | 9/2003 |
| WO | 2004/018570 A2 | 3/2004 |
| WO | 2004/018580 A1 | 3/2004 |
| WO | 2009/021719 A2 | 2/2009 |
| WO | 2009/115504 A1 | 9/2009 |
| WO | WO 2013/129517 * | 9/2013 |

OTHER PUBLICATIONS

International Search Report dated Aug. 11, 2014 in PCT/EP13/74102 Filed Nov. 18, 2013.

* cited by examiner

TWO-STAGE METHOD FOR DIP-COATING ELECTRICALLY CONDUCTIVE SUBSTRATES USING A BI (III)-CONTAINING COMPOSITION

CROSS-REFERENCE TO RELATED APPLICATIONS

The present application is a national stage of International Application No. PCT/EP2013/074102, filed Nov. 18, 2013.

BACKGROUND OF THE INVENTION

Field of the Invention

The present invention relates to a method for at least partly coating an electrically conductive substrate with an electrocoat material, comprising at least contacting the substrate with an aqueous coating composition (A) as step (1), which is carried out in at least two successive stages (1a) and (1b), i.e., first at an applied voltage in a range from 1 to 50 V (1a), which is applied over a duration of at least 5 seconds, and then in a range from 50 to 400 V (1b), the voltage applied in (1b) being greater by at least 10 V than the voltage applied in (1a), with (A) comprising at least one cathodically depositable binder (A1), at least one organic monocarboxylic or polycarboxylic acid which has no nitrogen atom(s), and/or anions thereof (A3) and trivalent bismuth (A4), with (A3) and (A4) each being present in (A) in an amount such that their stoichiometry to one another allows at least 50 mol % of (A4) to be present in the form of a salt and/or complex of components (A3) and (A4), with the molar fractions of any zirconium ions and aminopolycarboxylic acids optionally present in (A) to be lower at least by a factor in each case of 100 or of 15, respectively, than the molar fraction of (A4) present in (A); to a use of (A) for at least partly coating the substrate with an electrocoat material; to at least partly coated electrically conductive substrates obtainable by the method; and to articles or components produced from such substrates.

Description of Related Art

A normal requirement within the automobile sector is that the metallic components used for manufacture must be protected against corrosion. The requirements concerning the corrosion prevention to be achieved are very stringent, especially as the manufacturers often give a guarantee against rust perforation over many years. Such corrosion prevention is normally achieved by coating the components, or the substrates used in their manufacture, with at least one coating apt for the purpose.

A disadvantage of the known coating methods, particularly affecting the known methods employed within the automobile industry, is that these methods normally envisage a phosphatizing pretreatment step, in which the substrate for coating, after an optional cleaning step and before a dip coating step, is treated with a metal phosphate such as zinc phosphate in a phosphatizing step, in order to ensure adequate corrosion prevention. This pretreatment normally entails the implementation of a plurality of method steps in a plurality of different dipping tanks with different heating. During the implementation of such pretreatment, moreover, waste sludges are produced, which burden the environment and have to be disposed of. On environmental and economic grounds, therefore, it is especially desirable to be able to forgo such a pretreatment step, but nevertheless to achieve at least the same corrosion prevention effect as achieved using the known methods.

EP 1 889 952 A1 and EP 1 884 579 A1 disclose methods for coating electrically conductive substrates that each envisage at least two-stage electrical deposition of a coating material on the substrate. The coating composition used there necessarily includes a zirconium compound and optionally further compounds containing metal atoms, the metal atoms being selected from the group consisting of Ti, Co, V, W, Mo, Cu, Zn, In, Al, Bi, Y, lanthanide metals, alkali metals, and alkaline earth metals. A disadvantage of the methods known from EP 1 889 952 A1 and EP 1 884 579 A1, however, is that the zirconium-containing coated substrates obtained accordingly do not meet the requirement of sufficient corrosion prevention.

EP 2 405 035 A1 and JP 2011-057944 A each disclose coating composition electrophoretically depositable in a two-stage coating process and comprising 100 to 1000 ppm and 100 to 5000 ppm, respectively, of bismuth ions and mandatorily an aminopolycarboxylic acid such as ethylenediaminetetraacetic acid (EDTA) and anions thereof, for example, in 0.5 to 10 times and 0.1 to 5 times, respectively, the molar concentration, based in each case on the molar concentration of the bismuth ions. With electrocoating compositions, however, the presence of such acids leads to disadvantages in terms of bath stability, since they cannot be transferred to the anolyte circuit by the dialysis membranes that are commonly used, and they therefore accumulate in the dip coating bath. The use of such aminopolycarboxylic acids, moreover, has the disadvantage that their presence in dip coating baths can lead to problems associated with wastewater treatment, if these acids enter—as a result of discharge of ultrafiltrate, for example—the wastewater pretreatment plants. If the aminopolycarboxylic acids subsequently reach natural bodies of water, they may pollute them by mobilization of heavy metals. In electrodeposition coating systems, therefore, these aminopolycarboxylic acids are unwanted, and/or their proportion therein should be minimized.

Cathodically depositable bismuth-containing coating compositions which can be deposited onto a suitable substrate in a one-stage coating step are known, moreover, from EP 1 000 985 A1, WO 2009/021719 A2, WO 2004/018580 A1, WO 2004/018570 A2, WO 00/34398 A1 and WO 95/07319 A1. A disadvantage of the methods disclosed therein, however, is that the coated substrates obtained accordingly do not have sufficient corrosion prevention.

A need exists, therefore, for a method for at least partial coating of an electrically conductive substrate that can be implemented—especially with a view to forgoing the normally implemented phosphatizing pretreatment step—more economically and more environmentally than the conventional methods, while being nevertheless suitable at least in equal degree for achieving the corrosion prevention effect necessary. There is a need, moreover, for a method of this kind with which a corrosion prevention effect is achievable that is an improvement on methods customarily employed.

SUMMARY OF THE INVENTION

It is therefore an object of the present invention to provide a method for at least partial coating of on electrically conductive substrate, said method having advantages over the methods known from the prior art.

More particularly, it is an object of the present invention to provide such a method which enables more economical and environmentally safer coating than conventional coating processes, i.e. which makes it possible, for example, to do without the phosphatization by means of a metal phosphate which typically has to be conducted prior to dip-coating, but which can nevertheless achieve at least the same and especially improved corrosion prevention effect compared to that achieved by the customary processes.

This object is achieved by the subject matter claimed in the patent claims, and the preferred embodiments of this subject matter described in the description which follows.

A first subject of the present invention is therefore a method for at least partly coating an electrically conductive substrate with an electrocoat material, comprising at least a step (1), (1) contacting the electrically conductive substrate, connected as cathode, with an aqueous coating composition (A),
step (1) being carried out in at least two successive stages (1a) and (1b) as follows:
(1a) at an applied voltage in a range from 1 to 50 V, which is applied over a duration of at least 5 seconds, and
(1b) at an applied voltage in a range from 50 to 400 V, with the proviso that the voltage applied in stage (1b) is greater by at least 10 V than the voltage applied in stage (1a),
the aqueous coating composition (A) comprising
(A1) at least one cathodically depositable binder,
(A2) optionally at least one crosslinking agent,
(A3) at least one organic monocarboxylic or polycarboxylic acid having no nitrogen atom(s), and/or anions thereof, and
(A4) trivalent bismuth, i.e. Bi(III),
the at least one organic monocarboxylic acid or polycarboxylic acid (A3) and/or anions thereof and the trivalent bismuth as component (A4) each being present in the aqueous coating composition (A) in an amount such that their stoichiometry to one another allows at least 50 mol % of the trivalent bismuth to be present in the form of a salt and/or complex, preferably of a salt, of components (A3) and (A4),
wherein
the molar fraction of any zirconium ions present in the aqueous coating composition (A) being smaller by a factor of at least 100 than the molar fraction of trivalent bismuth present in the aqueous coating composition (A), and
the molar fraction of any aminopolycarboxylic acid present in the aqueous coating composition (A) being smaller by a factor of at least 15 than the molar fraction of trivalent bismuth present in the aqueous coating composition (A).

The present invention further provides a method for at least partly coating an electrically conductive substrate with an electrocoat material, comprising at least a step (1), (1) contacting the electrically conductive substrate, connected as cathode, with an aqueous coating composition (A),
step (1) being carried out in at least two successive stages (1a) and (1b):
(1a) at an applied voltage in a range from 1 to 50 V, which is applied over a duration of at least 5 seconds, and
(1b) at an applied voltage in a range from 50 to 400 V, with the proviso that the voltage applied in stage (1b) is greater by at least 10 V than the voltage applied in stage (1a),
and
the aqueous coating composition (A) comprising
(A1) at least one cathodically depositable binder,
(A2) optionally at least one crosslinking agent,
(A3) at least one organic monocarboxylic or polycarboxylic acid having no nitrogen atom(s), and/or anions thereof, and
(A4) trivalent bismuth,
the aqueous coating composition (A) being prepared by
reacting at least one component (A3) in the form of an aqueous solution with at least one compound containing trivalent bismuth (A4) and
mixing the resulting aqueous solution or dispersion or suspension, preferably solution, of the reaction product of (A3) and the (A4)-comprising compound at least with component (A1) and optionally (A2), to give the aqueous coating composition (A), the at least one organic monocarboxylic acid or polycarboxylic acid (A3) and/or anions thereof and the trivalent bismuth as component (A4) preferably each being present in the aqueous coating composition (A) in an amount such that their stoichiometry to one another allows at least 50 mol % of the trivalent bismuth to be present in the form of a salt and/or complex of components (A3) and (A4),
wherein
the molar fraction of any zirconium ions present in the aqueous coating composition (A) being smaller by a factor of at least 100 than the molar fraction of trivalent bismuth present in the aqueous coating composition (A), and
the molar fraction of any aminopolycarboxylic acid present in the aqueous coating composition (A) being smaller by a factor of at least 15 than the molar fraction of trivalent bismuth present in the aqueous coating composition (A).

The aqueous coating composition (A) used in accordance with the invention therefore serves for producing an electrocoat on a substrate surface of an electrically conductive substrate.

It has surprisingly been found that the method of the invention makes it possible to be able to forgo the pretreatment step normally needing to be carried out prior to dip coating, more particularly electrocoating, the electrically conductive substrate for at least partial coating with a metal phosphate such as zinc phosphate in order to form a metal phosphate layer on the substrate, thereby allowing the coating method in question to be made overall not only more economical, more particularly less time-consuming and cost-intensive, but also more environmental than conventional methods.

In particular it has surprisingly been found that the method of the invention allows the provision of electrically conductive substrates, coated at least partly with an electrocoat material, which in comparison to substrates coated accordingly by conventional methods have at least no disadvantages, and in particular have advantages, in terms of their corrosion prevention effect: accordingly, the coated substrates produced with the method of the invention are notable in particular, relative to corresponding comparative examples such as substrates coated with a method according to EP 1 889 952 A1 and EP 1 884 579 A1, for example, for the fact that the corrosive undermining, as a measure of corrosion prevention effect, is significantly lower.

It has further surprisingly been found that the method of the invention makes it possible to obtain significant Bi coating of the substrate, more particularly of not less than 10 mg/m² Bi, in particular through the two-stage step (1) and, within this step (1), through stage (1a); such coating is not achievable, for example, with a method according to EP 1 889 952 A1 and EP 1 884 579 A1.

It has surprisingly been found, moreover, that the method of the invention allows the provision of coated substrates with good corrosion prevention effect, while at the same time bypassing the use of environmentally harmful compounds such as aminopolycarboxylic acid, which, moreover, may accumulate in the dip coating bath, meaning that adequate stability for the dip coating bath is not ensured.

DESCRIPTION OF EMBODIMENTS

In one preferred embodiment, the term "comprising" in the sense of the present invention, as for example in connection with the aqueous coating composition (A) used in accordance with the invention, has the meaning of "consisting of". With regard to the coating composition (A) used in accordance with the invention in this preferred embodiment, one or more of the further components identified below and optionally present in the coating composition (A) used in accordance with the invention may be present in the coating composition (A), such as—besides (A1) (A3), (A4), and water, and also, optionally, (A2)—for example, the optional components (A5) and/or (A6) and/or (A7), and also organic solvents optionally present. All of these components may each be present in their preferred embodiments, as identified above and below, in the coating composition (A) used in accordance with the invention.

Substrate

Suitable electrically conductive substrates used in accordance with the invention are all of the electrically conductive substrates known to the skilled person that are customarily employed. The electrically conductive substrates used in accordance with the invention are preferably selected from the group consisting of steel, preferably steel selected from the group consisting of cold-rolled steel, galvanized steel such as dip-galvanized steel, alloy-galvanized steel (such as Galvalume, Galvannealed, or Galfan, for example) and aluminized steel, aluminum, and magnesium; particularly suitable are galvanized steel and aluminum. Suitable as substrates, moreover, are hot-rolled steel, high-strength steel, Zn/Mg alloys, and Zn/Ni alloys. Particularly suitable substrates are parts of bodies or complete bodies of automobiles for production. The method of the invention can also be used for coil coating. Before the electrically conductive substrate in question is used, the substrate is preferably cleaned and/or degreased.

The electrically conductive substrate used in accordance with the invention may be a substrate pretreated with at least one metal phosphate. The electrically conductive substrate used in accordance with the invention may, moreover, be a chromate substrate. Such pretreatment by phosphatizing or chromating, which normally takes place after the substrate has been cleaned and before it is dip-coated, is, in particular, a pretreatment step customary within the automobile industry. In this context it is especially desirable for a pretreatment, carried out optionally, to be designed advantageously from environmental and/or economic aspects. Therefore, for example, an optional pretreatment step is possible in which instead of a customary trication phosphatizing, the nickel component is omitted and instead a dication phosphatizing (comprising zinc and manganese cations and no nickel cations) is carried out on the electrically conductive substrate used in accordance with the invention, prior to coating with the aqueous coating composition (A).

A specific object of the present invention, however, is that it is possible to forgo such pretreatment of the electrically conductive substrate for at least partial coating, by phosphatizing with a metal phosphate such as zinc phosphate, for example, or by means of chromating. In one preferred embodiment, therefore, the electrically conductive substrate used in accordance with the invention is not such a phosphatized or chromated substrate.

Prior to being coated with the aqueous coating composition (A) used in accordance with the invention, the electrically conductive substrate used in accordance with the invention may be pretreated with an aqueous pretreatment composition which comprises at least one water-soluble compound containing at least one Ti atom and/or at least one Zr atom and which comprises at least one water-soluble compound as source of fluoride ions, containing at least one fluorine atom, or with an aqueous pretreatment composition which comprises a water-soluble compound obtainable by reaction of at least one water-soluble compound containing at least one Ti atom and/or at least one Zr atom with at least one water-soluble compound as a source of fluoride ions, containing at least one fluorine atom.

The at least one Ti atom and/or the at least one Zr atom in this case preferably have the +4 oxidation state. By virtue of the components it contains and preferably by virtue, moreover, of the appropriately selected proportions of these components, the aqueous pretreatment composition preferably comprises a fluoro complex, such as a hexafluorometallate, i.e., in particular, hexafluorotitanate and/or at least one hexafluorozirconate. The pretreatment composition preferably has a total concentration of the elements Ti and/or Zr which is not below $2.5 \cdot 10^{-4}$ mol/L but is not greater than $2.0 \times 10^{-2}$ mol/L. The preparation of such pretreatment compositions and their use in the pretreatment of electrically conductive substrates are known from WO 2009/115504 A1, for example.

The pretreatment composition preferably further comprises copper ions, preferably copper(II) ions, and also, optionally, one or more water-soluble and/or water-dispersible compounds comprising at least one metal ion selected from the group consisting of Ca, Mg, Al, B, Zn, Mn, and W, and also mixtures thereof, preferably at least one aluminosilicate, and more particularly one having an atomic ratio of Al to Si atoms of at least 1:3. The preparation of such pretreatment compositions and their use in the pretreatment of electrically conductive substrates are known from WO 2009/11504 A1, for example. The aluminosilicates are present preferably in the form of nanoparticles having an average particle size in the range from 1 to 100 nm as determinable by dynamic light scattering. The average particle size for such nanoparticles, in the range from 1 to 100 nm, as determinable by dynamic light scattering, is determined in accordance with DIN ISO 13321 (date: Oct. 1, 2004).

In one preferred embodiment, however, the electrically conductive substrate used in accordance with the invention is a substrate which has not been pretreated with any such pretreatment composition.

Coating Composition (A)

The aqueous coating composition (A) used in accordance with the invention is suitable for at least partly coating an electrically conductive substrate with an electrocoat material, meaning that it is apt to be applied at least partly in the form of an electrocoat to the substrate surface of an electrically conductive substrate. Preferably the entire aqueous coating composition (A) used in accordance with the invention is cathodically depositable.

The aqueous coating compositions (A) used in accordance with the invention comprise water as liquid diluent.

The term "aqueous" in connection with the coating composition (A) refers preferably to liquid coating compositions (A) which comprise water as the main component of their liquid diluent, i.e., as liquid solvent and/or dispersion medium. Optionally, however, the coating compositions (A) may include at least one organic solvent in minor fractions. Examples of such organic solvents include heterocyclic, aliphatic or aromatic hydrocarbons, mono- or polyhydric alcohols, especially methanol and/or ethanol, ethers, esters, ketones, and amides, such as, for example, N-methylpyrrolidone, N-ethylpyrrolidone, dimethyl-formamide, toluene, xylene, butanol, ethyl glycol and butyl glycol and also their acetates, butyl diglycol, diethylene glycol dimethyl ether, cyclohexanone, methyl ethyl ketone, methylisobutyl ketone, acetone, isophorone, or mixtures thereof. The fraction of these organic solvents is preferably not more than 20.0 wt %, more preferably not more than 15.0 wt %, very preferably not more than 10.0 wt %, more particularly not more than 5.0 wt % or not more than 4.0 wt % or not more than 3.0 wt %, more preferably still not more than 2.5 wt % or not more than 2.0 wt % or not more than 1.5 wt %, most preferably not more than 1.0 wt % or not more than 0.5 wt %, based in each case on the total fraction of the liquid diluents—i.e., liquid solvents and/or dispersion media—that are present in coating composition (A).

The fractions in wt % of all components included in the coating composition (A) of the invention, in other words the fractions of (A1), (A3), (A4), and water, and also optionally of (A2) and/or (A5) and/or (A6) and/or (A7) and/or of organic solvents, add up preferably to 100 wt %, based on the total weight of the coating composition (A).

The aqueous coating composition (A) preferably has solids content in the range from 5 to 45 wt %, more preferably in the range from 7.5 to 35 wt %, very preferably from 10 to 30 wt %, more preferably still in the range from 12.5 to 25 wt % or in the range from 15 to 30 wt % or in the range from 15 to 25 wt %, more particularly from 17 to 22 wt %, based in each case on the total weight of the aqueous coating composition (A).

Methods for determining the solids content are known to the skilled person. The solids content is determined preferably according to DIN EN ISO 3251 (date: Jun. 1, 2008), more particularly over a time of 30 minutes at 180° C. as per said standard.

The aqueous coating composition (A) used in accordance with the invention is preferably an aqueous dispersion or solution, preferably an aqueous dispersion.

The coating composition (A) used in accordance with the invention has a pH in the range from 2.0 to 10.0, more preferably in the range from 2.5 to 8.5 or in the range from 2.5 to 8.0, very preferably in the range from 3.0 to 7.0 or in the range from 3.0 to 6.5 or in the range from 3.0 to 6.0, more particularly in the range from 3.5 to 6.0 or in the range from 3.5 to 5.5, especially preferably in the range from 3.7 to 5.5, most preferably in the range from 3.9 to 5.5 or 4.0 to 5.5. Methods for setting pH levels in aqueous compositions are known to the skilled person. The desired pH is preferably set by addition of at least one acid, more preferably at least one inorganic and/or at least one organic acid. Examples of suitable inorganic acids are hydrochloric acid, sulfuric acid, phosphoric acid and/or nitric acid. An example of a suitable organic acid is propionic acid, lactic acid, acetic acid and/or formic acid. Alternatively or additionally and also preferably it is possible as well to use the at least one component (A3) present in the coating composition (A) for setting the pH level.

The aqueous coating composition (A) is prepared preferably by reacting at least one component (A3) in the form of an aqueous solution with at least one compound comprising trivalent bismuth (A4), and mixing the resulting aqueous solution or dispersion or suspension, preferably solution, optionally after filtration, of the reaction product of (A3) and the compound comprising (A4) at least with component (A1) and optionally (A2), to give the aqueous coating composition (A).

Component (A1) and Optional Component (A2)

The aqueous coating composition (A) used in accordance with the invention comprises at least one cathodically depositable binder as component (A1) and optionally at least one crosslinking agent as component (A2).

The term "binder" as part of the coating composition (A) encompasses for the purposes of the present invention preferably the cathodically depositable polymeric resins, those responsible for film-forming, of the aqueous coating composition (A) used in accordance with the invention, although any crosslinking agent present is not included in the concept of the binder. A "binder" in the sense of the present invention is therefore preferably a polymeric resin, although any crosslinking agent present is not included in the concept of the binder. In particular, moreover, any pigments and fillers present are not subsumed within the concept of the binder. Preferably, moreover, polycarboxylic acid present as component (A3) is not subsumed by the concept of the binder.

The coating composition (A) used in accordance with the invention is preferably prepared using an aqueous dispersion or aqueous solution, more preferably at least one aqueous dispersion, which comprises the at least one cathodically depositable binder (A1) and the optionally present at least one crosslinking agent (A2). This aqueous dispersion or solution comprising (A1) and optionally (A2) preferably has a nonvolatile fraction, i.e., a solids content, in a range from 25 to 60 wt %, more preferably in a range from 27.5 to 55 wt %, very preferably in range from 30 to 50 wt %, more preferably still in a range from 32.5 to 45 wt %, more particularly in a range from 35 to 42.5 wt %, based in each case on the total weight of this aqueous dispersion or solution.

The skilled person knows of cathodically depositable binders (A1). Very preferably the binder is cathodically depositable binder. The inventively employed binder is preferably a binder dispersible or soluble in water.

All customary cathodically depositable binders known to the skilled person are suitable here as binder component (A1) of the aqueous coating composition (A) used in accordance with the invention.

The binder (A1) preferably has reactive functional groups which permit a crosslinking reaction. The binder (A1) here a self-crosslinking or an externally crosslinking binder, preferably an externally crosslinking binder. In order to permit a crosslinking reaction, therefore, the coating composition (A) preferably further includes at least one crosslinking agent (A2) as well as the at least one binder (A1).

The binder (A1) present in the coating composition (A), or the crosslinking agent (A2) optionally present, is preferably thermally crosslinkable. The binder (A1) and the crosslinking agent (A2) optionally present are preferably crosslinkable on heating to temperatures above room temperature, i.e., above 18-23° C. The binder (A1) and the crosslinking agent (A2) optionally present are preferably crosslinkable only at oven temperatures ≥80° C., more preferably ≥110° C., very preferably ≥130° C., and especially preferably ≥140° C. With particular advantage the binder (A1) and the crosslinking agent (A2) optionally present are crosslinkable at 100 to 250° C., more preferably at 125 to 250° C., and very preferably at 150 to 250° C.

The coating composition (A) preferably comprises at least one binder (A1) which has reactive functional groups which permit a crosslinking reaction preferably in combination with at least one crosslinking agent (A2).

Any customary crosslinkable reactive functional group known to the skilled person is contemplated here. The binder (A1) preferably has reactive functional groups selected from the group consisting of optionally substituted primary amino groups, optionally substituted secondary amino groups, substituted tertiary amino groups, hydroxyl groups, thiol groups, carboxyl groups, groups which have at least one C=C double bond, such as vinyl groups or (meth)acrylate groups, for example, and epoxide groups, it being possible for the primary and secondary amino groups to be substituted by 1 or 2 or 3 substituents in each case independently of one another selected from the group consisting of $C_{1-6}$ aliphatic radicals such as methyl, ethyl, n-propyl or isopropyl, for example, and it being possible for these $C_{1-6}$ aliphatic radicals in turn to be substituted optionally by 1, 2, or 3 substituents in each case independently of one another selected from the group consisting of OH, $NH_2$, $NH(C_{1-6}$ alkyl), and $N(C_{1-6}$ alkyl$)_2$. Particularly preferred is at least one binder (A1) which has reactive functional groups selected from the group consisting of optionally substituted primary amino groups, optionally substituted secondary amino groups, and hydroxyl groups, it being possible for the primary and secondary amino groups to be substituted optionally by 1 or 2 or 3 substituents in each case independently of one another selected from the group consisting of $C_{1-6}$ aliphatic radicals such as methyl, ethyl, n-propyl, or isopropyl, for example, and it being possible for these $C_{1-6}$ aliphatic radicals in turn to be substituted optionally by 1, 2, or 3 substituents in each case independently of one another selected from the group consisting of OH, $NH_2$, $NH(C_{1-6}$ alkyl), and $N(C_{1-6}$ alkyl$)_2$. The reactive functional groups here, especially the optionally substituted primary and secondary amino groups, may optionally be present at least partly in protonated form.

With particular preference the binder (A1) has tertiary amino groups optionally present at least partly in protonated form, very preferably those tertiary amino groups which in each case independently of one another have at least two $C_{1-3}$ alkyl groups each substituted at least singly by a hydroxyl group, more particularly having in each case independently of one another two hydroxyethyl groups, two hydroxypropyl groups, or one hydroxypropyl and one hydroxyethyl group, the binder (A1) preferably being at least one polymeric resin. Such binders may be obtained, for example, by a method which is described in JP 2011-057944 A.

The binder (A1) present in the coating composition (A) is preferably at least one acrylate-based polymeric resin and/or at least one epoxide-based polymeric resin, more particularly at least one cationic epoxide-based and amine-modified resin. The preparation of cationic, amine-modified, epoxide-based resins of this kind is known and is described in, for example, DE 35 18 732, DE 35 18 770, EP 0 004 090, EP 0 012 463, EP 0 961 797 B1, and EP 0 505 445 B1. Cationic epoxide-based amine-modified resins are understood preferably to be reaction products of at least one optionally modified polyepoxide, i.e., of at least one optionally modified compound having two or more epoxide groups, with at least one preferably water-soluble amine, preferably with at least one such primary and/or secondary amine. Particularly preferred polyepoxides are polyglycidyl ethers of polyphenols prepared from polyphenols and epihalohydrines. Polyphenols that may be used include, in particular, bisphenol A and/or bisphenol F. Other suitable polyepoxides are polyglycidyl ethers of polyhydric alcohols, such as ethylene glycol, diethylene glycol, triethylene glycol, 1,2-propylene glycol, 1,4-propylene glycol, 1,5-pentanediol, 1,2,6-hexanetriol, glycerol, and 2,2-bis(4-hydroxycyclohexyl)propane. Modified polyepoxides are those polyepoxides in which some of the reactive functional groups have undergone reaction with at least one modifying compound. Examples of such modifying compounds are as follows:

a) compounds containing carboxyl groups, such as saturated or unsaturated monocarboxylic acids (e.g., benzoic acid, linseed oil fatty acid, 2-ethylhexanoic acid, Versatic acid), aliphatic, cycloaliphatic and/or aromatic dicarboxylic acids of various chain lengths (e.g., adipic acid, sebacic acid, isophthalic acid, or dimeric fatty acids), hydroxyalkylcarboxylic acids (e.g., lactic acid, dimethylolpropionic acid), and carboxyl-containing polyesters, or b) compounds containing amino groups, such as diethylamine or ethylhexylamine or diamines having secondary amino groups, e.g., N,N'-dialkyl-alkylenediamines, such as dimethylethylenediamine, N,N'-dialkyl-polyoxyalkyleneamines, such as N,N'-dimethylpolyoxypropylenediamine, cyanalkylated alkylenediamines, such as bis-N,N'-cyanethyl-ethylenediamine, cyanalkylated polyoxyalkyleneamines, such as bis-N,N'-cyanethylpolyoxypropylenediamine, polyaminoamides, such as Versamides, for example, especially amino-terminated reaction products of diamines (e.g., hexamethylenediamine), polycarboxylic acids, especially dimer fatty acids, and monocarboxylic acids, especially fatty acids, or the reaction product of one mole of diaminohexane with two moles of monoglycidyl ether, or monoglycidyl esters, especially glycidyl esters of α-branched fatty acids, such as of Versatic acid, or c) compounds containing hydroxyl groups, such as neopentyl glycol, bisethoxylated neopentyl glycol, neopentyl glycol hydroxypivalate, dimethylhydantoin-N,N'-diethanol, hexane-1,6-diol, hexane-2,5-diol, 1,4-bis(hydroxymethyl) cyclohexane, 1,1-isopropylidenebis(p-phenoxy)-2-propanol, trimethylolpropane, pentaerythritol, or amino alcohols, such as triethanolamine, methyldiethanolamine, or hydroxyl-containing alkylketimines, such as aminomethylpropane-1,3-diol methyl isobutyl ketimine or tris(hydroxymethyl)aminomethane cyclohexanone ketimine, and also polyglycol ethers, polyester polyols, polyether polyols, polycaprolactone polyols, polycaprolactam polyols of various functionalities and molecular weights, or d) saturated or unsaturated fatty acid methylesters, which are transesterified in the presence of sodium methoxide with hydroxyl groups of the epoxy resins. Examples of amines which can be used are mono- and dialkylamines, such as methylamine, ethylamine, propylamine, butylamine, dimethylamine, diethylamine, dipropylamine, methylbutylamine, alkanolamines, such as methylethanolamine or diethanolamine, for example, and dialkylaminoalkylamines, such as dimethylaminoethylamine, diethylaminopropylamine, or dimethylaminopropylamine, for example. The amines that can be used may also contain other functional groups as well, provided these groups do not disrupt the reaction of the amine with the epoxide group of the optionally modified polyepoxide and also do not lead to gelling of the reaction mixture. Secondary amines are preferably used. The charges which are needed for dilutability with water and for electrical deposition may be generated by protonation with water-soluble acids (e.g., boric acid, formic acid, acetic acid, lactic acid, preferably acetic acid). A further possibility for introducing cationic groups into the optionally modified polyepoxide lies in the reaction of epoxide groups in the polyepoxide with amine salts.

Besides the at least one cathodically depositable binder (A1), the coating composition (A) preferably comprises at least one crosslinking agent (A2) which permits a crosslinking reaction with the reactive functional groups of the binder (A1)

All customary crosslinking agents (A2) known to the skilled person may be used, such as phenolic resins, polyfunctional Mannich bases, melamine resins, benzoguanamine resins, epoxides, free polyisocyanates and/or blocked polyisocyanates, particularly blocked polyisocyanates.

A particularly preferred crosslinking agent (A2) is a blocked polyisocyanate. Blocked polyisocyanates which can be utilized are any polyisocyanates such as diisocyanates, for example, in which the isocyanate groups have been reacted with a compound and so the blocked polyisocyanate formed is stable in particular with respect to hydroxyl and amino groups, such as primary and/or secondary amino groups, at room temperature, i.e., at a temperature of 18 to 23° C., but reacts at elevated temperatures, as for example at ≥80° C., more preferably 110° C., very preferably ≥130° C., and especially preferably ≥140° C., or at 90° C. to 300° C. or at 100 to 250° C., more preferably at 125 to 250° C., and very preferably at 150 to 250° C.

In the preparation of the blocked polyisocyanates it is possible to use any desired organic polyisocyanates that are suitable for crosslinking. Isocyanates used are preferably (hetero)aliphatic, (hetero)cycloaliphatic, (hetero)aromatic, or (hetero)aliphatic-(hetero)aromatic isocyanates. Preferred are diisocyanates which contain 2 to 36, more particularly 6 to 15, carbon atoms. Preferred examples are 1,2-ethylene diisocyanate, 1,4-tetramethylene diisocyanate, 1,6-hexamethylene diisocyanate (HDI), 2,2,4(2,4,4)-trimethyl-1,6-hexamethylene diisocyanate (TMDI), diphenylmethane diisocyanate (MDI), 1,9-diisocyanato-5-methylnonane, 1,8-diisocyanato-2,4-dimethyloctane, 1,12-dodecane diisocyanate, ω,ω'-diisocyanatodipropyl ether, cyclobutene 1,3-diisocyanate, cyclohexane 1,3- and 1,4-diisocyanate, 3-isocyanatomethyl-3,5,5-trimethylcyclohexyl isocyanate (isophorone diisocyanate, IPDI), 1,4-diisocyanatomethyl-2,3,5,6-tetramethylcyclohexane, decahydro-8-methyl-1,4-methanonaphthalen-2 (or 3),5-ylenedimethylene diisocyanate, hexahydro-4,7-methano-indan-1 (or 2),5 (or 6)-ylenedimethylene diisocyanate, hexahydro-4,7-methanoindan-1 (or 2),5 (or 6)-ylene diisocyanate, 2,4- and/or 2,6-hexahydrotolylene diisocyanate (H6-TDI), 2,4- and/or 2,6-tolylene diisocyanate (TDI), perhydro-2,4'-diphenylmethane diisocyanate, perhydro-4,4'-diphenylmethane diisocyanate ($H_{12}$MDI), 4,4'-diisocyanato-3,3',5,5'-tetramethyldicyclohexylmethane, 4,4'-diisocyanato-2,2',3,3',5,5',6,6'-octamethyldicyclohexylmethane, ω,ω'-diisocyanato-1,4-diethylbenzene, 1,4-diisocyanatomethyl-2,3,5,6-tetramethylbenzene, 2-methyl-1,5-diisocyanatopentane (MPDI), 2-ethyl-1,4-diisocyanatobutane, 1,10-diisocyanatodecane, 1,5-diisocyanatohexane, 1,3-diisocyanatomethylcyclohexane, 1,4-diisocyanatomethylcyclohexane, 2,5(2,6)-bis(isocyanatomethyl)bicyclo[2.2.1]heptane (NBDI), and also any mixture of these compounds. Polyisocyanates of higher isocyanate functionality may also be used. Examples thereof are trimerized hexamethylene diisocyanate and trimerized isophorone diisocyanate. Furthermore, mixtures of polyisocyanates may also be utilized. The organic polyisocyanates contemplated as crosslinking agents (A2) for the invention may also be prepolymers, deriving, for example, from a polyol, including from a polyether polyol or a polyester polyol. Especially preferred are 2,4-toluene diisocyanate and/or 2,6-toluene diisocyanate (TDI), and/or isomer mixtures of 2,4-toluene diisocyanate and 2,6-toluene diisocyanate, and/or diphenylmethane diisocyanate (MDI).

Used preferably for the blocking of polyisocyanates may be any desired suitable aliphatic, cycloaliphatic, or aromatic alkyl monoalcohols. Examples thereof are aliphatic alcohols, such as methyl, ethyl, chloroethyl, propyl, butyl, amyl, hexyl, heptyl, octyl, nonyl, 3,3,5-trimethylhexyl, decyl, and lauryl alcohol; cycloaliphatic alcohols such as cyclopentanol and cyclohexanol; aromatic alkyl alcohols, such as phenylcarbinol and methylphenylcarbinol. Other suitable blocking agents are hydroxylamines, such as ethanolamine, oximes, such as methyl ethyl ketone oxime, acetone oxime, and cyclohexanone oxime, and amines, such as dibutylamine and diisopropylamine.

The relative weight ratio of the at least one binder (A1) to the optionally present at least one crosslinking agent (A2) in the coating composition (A) used in accordance with the invention is preferably in a range from 4:1 to 1.1:1, more preferably in a range from 3:1 to 1.1:1, very preferably in a range from 2.5:1 to 1.1:1, more particularly in a range from 2.1:1 to 1.1:1, based in each case on the solids content of the at least one binder (A1) and of the at least one crosslinking agent (A2) in the coating composition (A).

In another preferred embodiment, the relative weight ratio of the at least one binder (A1) to the optionally present at least one crosslinking agent (A2) in the coating composition (A) used in accordance with the invention is in a range from 4:1 to 1.5:1, more preferably in a range from 3:1 to 1.5:1, very preferably in a range from 2.5:1 to 1.5:1, more particularly in a range from 2.1:1 to 1.5:1, based in each case on the solids content of the at least one binder (A1) and of the at least one crosslinking agent (A2) in the coating composition (A).

Component (A3)

The aqueous coating composition (A) used in accordance with the invention comprises at least one organic monocarboxylic or polycarboxylic acid having no nitrogen atom(s), and/or anions thereof, as component (A3), and trivalent bismuth as component (A4), the at least one organic monocarboxylic or polycarboxylic acid (A3) and/or anions thereof and the trivalent bismuth as component (A4) are preferably each present in the aqueous coating composition (A) in an amount such that their stoichiometry to one another allows at least 50 mol % of the trivalent bismuth to be present in the form of a salt and/or complex, preferably a salt, of the components (A3) and (A4).

Preferably, therefor, the at least one organic monocarboxylic or polycarboxylic acid and/or anions thereof are suitable for forming salts and/or complexes with the trivalent bismuth present in the aqueous coating composition (A). The term "salt" here refers preferably to a chemical compound constructed of positively charged bismuth cations and negatively charged anions. The term "complex" refers preferably to a chemical complex which has at least one preferably charged bismuth atom that is complexed by at least one ligand. The at least one bismuth atom here is preferably a central atom of the complex. A ligand is preferably at least one molecule of the organic monocarboxylic or polycarboxylic acid and/or anions thereof (A4). Examples of such complexes are chelate complexes.

The coating composition (A) used in accordance with the invention preferably comprises a preferably water-soluble reaction product of (A3) and (A4). "Water-soluble" in this context refers preferably to a reaction product whose solubility in water at temperature of 25° C. is at least 1 g per 100 mL of water. The water-solubility of the reaction product of (A3) and (A4) is preferably more than 5 g per 100 mL, more preferably more than 10 g per 100 mL of water.

The term "polycarboxylic acid" refers in the sense of the present invention preferably to a carboxylic acid which has two or more carboxyl groups, as for example 2, 3, 4, 5, or 6 carboxyl groups. Very preferably the polycarboxylic acid has 2 or 3 carboxyl groups. Polycarboxylic acids having two carboxyl groups are dicarboxylic acids, and polycarboxylic acids having three carboxyl groups are tricarboxylic acids. The inventively employed polycarboxylic acids may be aromatic, partly aromatic, cycloaliphatic, partly cycloaliphatic, or aliphatic, preferably aliphatic. The inventively employed polycarboxylic acids preferably have 2 to 64 carbon atoms, more preferably 2 to 36, more particularly 3 to 18 or 3 to 8 carbon atoms.

The term "monocarboxylic acid" refers for the purposes of the present invention preferably to a preferably aliphatic monocarboxylic acid which has exactly one —C(=O)—OH group. The inventively employed monocarboxylic acids have preferably 1 to 64 carbon atoms, more preferably 1 to 36, more particularly 2 to 18 or 3 to 8 carbon atoms.

The at least one organic monocarboxylic or polycarboxylic acid (A3) and/or anions thereof and the trivalent bismuth as component (A4) are preferably each present in the aqueous coating composition (A) in an amount such that their stoichiometry to one another allows at least 75 mol %, more preferably at least 80 mol % or at least 90 mol % or at least 95 mol % or 100 mol %, of the trivalent bismuth to be present in the form of a salt and/or complex of the components (A3) and (A4).

The at least one organic monocarboxylic or polycarboxylic acid and/or anions thereof (A3) preferably has at least one carboxyl group and/or carboxylate group attached to an organic radical having 1-8 carbon atoms, it being possible for the organic radical to be substituted optionally by at least one, preferably at least one or at least two, substituents selected from the group consisting of hydroxyl groups, ester groups, and ether groups.

Component (A3) is preferably selected from the group consisting of monocarboxylic and polycarboxylic acids and/or anions thereof which in α-, β-, or γ-position to the at least one carboxyl group and/or carboxylate group have one or two alcoholic hydroxyl groups or ester groups or ether groups. Examples of such acids are as follows: glycolic acid (hydroxyacetic acid), lactic acid, γ-hydroxypropionic acid, α-methylolpropionic acid, α,α'-dimethylolpropionic acid, tartaric acid, hydroxyphenylacetic acid, malic acid, citric acid, and sugar acids such as, for example, gluconic acid and mucic acid. Cyclic or aromatic carboxylic acids are likewise suitable if the arrangement of the hydroxyl, ester, or ether groups relative to the carboxyl group is such as to enable formation of complexes. Examples of such are salicylic acid, gallic acid, and 2,4-dihydroxybenzoic acid. Examples of suitable carboxylic acids with an ether group or ester group are methoxyacetic acid, methyl methoxyacetate, isopropyl methoxyacetate, dimethoxyacetic acid, ethoxyacetic acid, propoxyacetic acid, butoxyacetic acid, 2-ethoxy-2-methylpropanoic acid, 3-ethoxypropanoic acid, butoxypropanoic acid and its esters, butoxybutyric acid, and α- or β-methoxypropionic acid. Optically active carboxylic acids such as lactic acid may be used in the L-form, in the D-form, or as the racemate. Preference is given to using lactic acid (in optically active form, preferably as L-form, or as racemate) and/or dimethylolpropionic acid.

The equivalents ratio of the at least one organic monocarboxylic or polycarboxylic acid and/or anions thereof (A3) to the trivalent bismuth (A4) present in the aqueous coating composition (A) is preferably at least 0.5, more preferably at least 0.75. This equivalents ratio refers to the quotient formed from the number of carboxyl groups in the at least one organic monocarboxylic or polycarboxylic acid and/or anions thereof (A3), in moles, and from the amount of trivalent bismuth (A4) present in (A), in moles. If, for example, for complete charge compensation of one mole of trivalent bismuth, there are three moles of anions of monobasic monocarboxylic acids (A3), resulting formally in a neutral salt, the equivalents ratio is 1. This is also the case if, rather than three moles of anions of monobasic monocarboxylic acids, one mole of a tricarboxylic acid is present.

Component (A3) functions preferably as a complexing agent for the trivalent bismuth present in (A). (A) preferably has an excess of component (A3) beyond an equivalents ratio of one, such as an equivalents ratio of 1.1 or 1.2 or 1.5 or 2, for example.

Particularly suitable components (A3) are those monocarboxylic or polycarboxylic acids and/or anions thereof that are capable of converting component (A4), more particularly the component (A4) prepared using bismuth(III) oxide, into an at least partly, preferably fully, water-soluble form, in water at temperatures in the range from 10 to 90° C. or in the range from 20 to 80° C., preferably in the range from 30 to 75° C.

Component (A4)

The aqueous coating composition (A) used in accordance with the invention comprises at least one organic monocarboxylic or polycarboxylic acid that has no nitrogen atom(s), and/or anions thereof, as component (A3), and trivalent bismuth, i.e., Bi(III), as component (A4); the at least one organic monocarboxylic or polycarboxylic acid (A3) and/or anions thereof and the trivalent bismuth as component (A4) are each present in the aqueous coating composition (A) in an amount such that their stoichiometry to one another allows at least 50 mol % of the trivalent bismuth to be present in the form of a salt and/or complex, preferably a salt, of the components (A3) and (A4).

The coating composition (A) preferably comprises component (A4) in an amount such that the trivalent bismuth content, calculated as bismuth metal, based on the total weight of the aqueous coating composition (A), is in a range from 10 ppm to 20 000 ppm, more preferably in a range from 50 ppm to 15 000 ppm, very preferably in a range from 100 ppm to 10 000 ppm, especially preferably in a range from 500 ppm to 10 000 ppm or in a range from 1000 ppm to 10 000 ppm or in a range from 1000 ppm to 5000 ppm or in a range from 500 ppm to 3000 ppm. The amount of bismuth, calculated as the metal, may be determined by means of the method hereinafter (ICP-OES).

The skilled person is aware that trivalent bismuth as component (A4) identifies that bismuth which has a valence of +3, or is present in oxidation state (III), i.e., Bi(III). This Bi(III) is present in the coating composition (A) preferably in the form of a Bi(III)-containing compound, as for example in the form of a salt and/or complex of component (A3) with Bi(III) as component (A4).

Component (A4) is preferably prepared using a bismuth (III)-containing compound which is at least partly, more preferably completely, water-insoluble. Examples of suitable bismuth(III)-containing compounds for preparing component (A4) are bismuth(III) oxide, basic bismuth(III) oxide, bismuth(III) hydroxide, bismuth(III) carbonate, bismuth(III) nitrate, bismuth(III) subnitrate (basic bismuth(III) nitrate), bismuth(III) salicylate and/or bismuth(III) subsalicylate (basic bismuth(III) salicylate).

Particularly preferred for use for preparing component (A4) is bismuth(III) oxide.

The aqueous coating composition (A) is preferably prepared by reacting at least one component (A3) in the form of an aqueous solution with at least one compound comprising trivalent bismuth (A4), to give an aqueous solution or dispersion or suspension, preferably solution, optionally after filtration, of the reaction product of (A3) and the compound comprising (A4), and using this preferably water-soluble reaction product for preparing the coating composition (A) used in accordance with the invention.

For preparing the aqueous coating composition (A), particular preference is given to reacting at least one component (A3) selected from the group consisting of lactic acid and dimethylpropionic acid in the form of an aqueous solution with at least one compound comprising trivalent bismuth (A4), preferably with bismuth(III) oxide, to give an aqueous solution or dispersion or suspension, preferably solution, optionally after filtration, of the reaction product of (A3) and the compound comprising (A4), and using this preferably water-soluble reaction product for preparing the coating composition (A) used in accordance with the invention.

Further Optional Components of the Coating Composition (A)

Depending on desired application, moreover, the aqueous coating composition (A) used in accordance with the invention may comprise at least one pigment (A5).

A pigment (A5) of this kind, present in the aqueous coating composition (A), is preferably selected from the group consisting of organic and inorganic, color-imparting and extending pigments.

This at least one pigment (A5) may be present as part of the aqueous solution or dispersion which is used for preparing the coating composition (A) and which comprises the components (A1) and optionally (A2).

The at least one pigment (A5) may alternatively be incorporated into the coating composition (A), in the form of a further aqueous dispersion or solution, different from the one used. In this embodiment, the corresponding pigment-containing aqueous dispersion or solution may further comprise at least one binder.

Examples of suitable inorganic color-imparting pigments (A5) are white pigments such as zinc oxide, zinc sulfide, titanium dioxide, antimony oxide, or lithopone; black pigments such as carbon black, iron manganese black, or spinel black; chromatic pigments such as cobalt green or ultramarine green, cobalt blue, ultramarine blue or manganese blue, ultramarine violet or cobalt violet and manganese violet, red iron oxide, molybdate red, or ultramarine red; brown iron oxide, mixed brown, spinel phases and corundum phases; or yellow iron oxide, nickel titanium yellow, or bismuth vanadate. Examples of suitable organic color-imparting pigments are monoazo pigments, disazo pigments, anthraquinone pigments, benzimidazole pigments, quinacridone pigments, quinophthalone pigments, diketopyrrolopyrrole pigments, dioxazine pigments, indanthrone pigments, isoindoline pigments, isoindolinone pigments, azomethine pigments, thioindigo pigments, metal complex pigments, perinone pigments, perylene pigments, phthalocyanine pigments, or aniline black. Examples of suitable extending pigments or fillers are chalk, calcium sulfate, barium sulfate, silicates such as talc or kaolin, silicas, oxides such as aluminum hydroxide or magnesium hydroxide, or organic fillers such as textile fibers, cellulose fibers, polyethylene fibers, or polymer powders; for further details, refer to Römpp Lexikon Lacke und Druckfarben, Georg Thieme Verlag, 1998, pages 250 ff., "Fillers".

The pigment content of the aqueous coating compositions (A) may vary according to intended use and according to the nature of the pigments (A5). The content, based in each case on the total weight of the aqueous coating composition (A), is preferably in the range from 0.1 to 30 wt % or in the range from 0.5 to 20 wt %, more preferably in the range from 1.0 to 15 wt %, very preferably in the range from 1.5 to 10 wt %, and more particularly in the range from 2.0 to 5.0 wt %, or in the range from 2.0 to 4.0 wt %, or in the range from 2.0 to 3.5 wt %.

Depending on desired application, the coating composition (A) may comprise one or more typically employed additives (A6). These additives (A6) are preferably selected from the group consisting of wetting agents, emulsifiers, which preferably do not contain component (A7), dispersants, surface-active compounds such as surfactants, flow control assistants, solubilizers, defoamers, rheological assistants, antioxidants, stabilizers, preferably heat stabilizers, in-process stabilizers, and UV and/or light stabilizers, catalysts, fillers, waxes, flexibilizers, plasticizers, and mixtures of the abovementioned additives. The additive content may vary very widely according to intended use. The content, based on the total weight of the aqueous coating composition (A), is preferably 0.1 to 20.0 wt %, more preferably 0.1 to 15.0 wt %, very preferably 0.1 to 10.0 wt %, especially preferably 0.1 to 5.0 wt %, and more particularly 0.1 to 2.5 wt %.

The at least one additive (A6) here may be present as part of the aqueous solution or dispersion which is used in preparing the coating composition (A) and which comprises the components (A1) and optionally (A2).

Alternatively the at least one additive (A6) may also be incorporated into the coating composition (A), in the form of a further aqueous dispersion or solution different from the one used, as for example within an aqueous dispersion or solution which comprises at least one pigment (A5) and optionally, moreover, at least one binder, or into an aqueous solution comprising a reaction product of (A3) and of a compound comprising (A4).

In one preferred embodiment, the coating composition (A) used in accordance with the invention is cathodically depositable miniemulsion which comprises at least one cationic emulsifier (A7). The term "miniemulsion" is familiar to the skilled person, from I. M. Grabs et al., Macromol. Symp. 2009, 275-276, pages 133-141, for example. A miniemulsion, accordingly, is an emulsion whose particles have an average size in the range from 5 to 500 nm. Methods for determining the average size of such particles are familiar to the skilled person. Such determination of average particle size takes place preferably by dynamic light scattering in accordance with DIN ISO 13321 (date: Oct. 1, 2004). Miniemulsions of these kinds are known from WO 82/00148 A1, for example. The at least one cationic emulsifier is preferably an emulsifier which has an HLB of ≥8, this being determined preferably by the method of Griffin, which is known to the skilled person. The emulsifier may have reactive functional groups. Such reactive functional groups contemplated are the same reactive functional groups which the binder (A1) may have as well. The emulsifier preferably has a hydrophilic head group, which preferably has a quaternary nitrogen atom bonded to which are four organic, preferably aliphatic radicals, such as organic radicals having 1-10 carbon atoms, for example, and a lipophilic tail group. At least one of these organic radicals preferably has hydroxyl group.

Optional Further Metal Ions and Aminopolycarboxylic Acids in (A)

The molar fraction of zirconium ions optionally present in the aqueous coating composition (A) is preferably lower by a factor of at least 100, preferably at least 200, more preferably at least 300 or 400 or 500 or 600 or 700 or 800 or 900 or 1000, than the molar fraction of trivalent bismuth present in the aqueous coating composition (A), preferably based in each case on the total weight of the aqueous composition (A). With more particular preference the coating composition (A) contains no zirconium ions.

Zirconium compounds employed typically in coating compositions for improving the corrosion prevention are often used in the form of salts or acids which contain zirconium ions, more particularly $[ZrF_6]^{2-}$ ions. When bismuth ions are present at the same time, however, the use of such $[ZrF_6]^{2-}$ ions results in precipitation of bismuth fluoride. The use of zirconium compounds in the coating composition (A) is therefore to be avoided.

Preferably, moreover, the molar fraction of ions optionally present in the aqueous coating composition (A) and selected from the group consisting of ions of the rare earth metals is lower by a factor of at least 100, very preferably by a factor of at least 200 or 300 or 400 or 500 or 600 or 700 or 800 or 900 or 1000, than the molar fraction of trivalent bismuth present in the aqueous coating composition (A), preferably based in each case on the total weight of the aqueous composition (A). More particularly the coating composition (A) contains no ions of rare earth metals. The presence of such ions makes the method of the invention more expensive and makes wastewater treatment more difficult. Such ions of rare earth metals are preferably selected from the group consisting of ions of Sc, Y, La, Ce, Pr, Nd, Pm, Sm, Eu, Gb, Td, Dy, Ho, Er, Tm, Yb, and Lu.

The molar fraction of any at least one aminopolycarboxylic acid present in the aqueous coating composition (A) is lower by a factor of at least 15 than the molar fraction of trivalent bismuth present in the aqueous coating composition (A), preferably based in each case on the total weight of the aqueous composition (A). The presence of such acids causes problems with dip bath stability and with wastewater treatment as a result of accumulation of these compounds in the dip bath.

The term "aminopolycarboxylic acid" refers in the sense of the present invention preferably to a carboxylic acid which has two or more carboxyl groups, as for example 2, 3, 4, 5, or 6 carboxyl groups, and also at least one amino group, as for example at least one primary and/or secondary and/or tertiary amino group, more particularly at least one or at least two tertiary amino groups.

The molar fraction of any aminopolycarboxylic acids present in the aqueous composition (A) is preferably lower by a factor of at least 20, more preferably at least 30 or 40 or 50 or 60 or 70 or 80 or 90 or 100 or 1000, than the molar fraction of trivalent bismuth present in the aqueous coating composition (A).

Step (1)

The method of the invention for at least partly coating an electrically conductive substrate with an electrocoat material comprises at least one step (1), this being a contacting of the electrically conductive substrate connected as cathode with the aqueous coating composition (A).

"Contacting" in the sense of the present invention refers preferably to the immersing of the substrate, intended for at least partial coating with the coating composition (A), into the aqueous coating composition (A) used, the spraying of the substrate intended for at least partial coating with the coating composition (A), or the roller application to the substrate intended for at least partial coating with the coating composition (A). More particularly, the term "contacting" in the sense of the present invention refers to immersing of the substrate intended for at least partial coating with the coating composition (A) into the aqueous coating composition (A) used.

The method of the invention is preferably a method for at least partly coating an electrically conductive substrate used in and/or for automobile construction. The method may take place continuously in the form of a strip coating operation, such as in the coil coating process, for example, or discontinuously.

With step (1) of the method of the invention, the substrate is at least partly coated with the aqueous coating composition (A) used in accordance with the invention by cataphoretic deposition of this coating composition on the substrate surface.

Step (1) is accomplished by applying an electrical voltage between the substrate and at least one counterelectrode. Step (1) of the method of the invention is carried out preferably in a dip-coating bath. The counterelectrode may in this case be located in the dip-coating bath. Alternatively or additionally, the counterelectrode may also be present separately from the dip-coating bath, for example via an anionic exchange membrane which is permeable for anions. In this case, anions formed during dip coating can be transported from the coating material through the membrane into the anolyte, allowing the pH in the dip-coating bath to be regulated or kept constant. The counterelectrode is preferably separate from the dip-coating bath.

In step (1) of the method of the invention, preferably, there is full coating of the substrate with the aqueous coating composition (A) used in accordance with the invention, by complete cataphoretic deposition on the entire substrate surface.

Preferably, in step (1) of the method of the invention, a substrate intended for at least partial coating is introduced at least partly, preferably completely, into a dip-coating bath, and step (1) is carried out within this dip-coating bath.

The aim in step (1) of the method of the invention is at least partial coating of the substrate by an at least partial cataphoretic deposition of the aqueous coating composition (A). The aqueous coating composition (A) used in accordance with the invention in this case is deposited as electrocoat material on the substrate surface.

The aqueous coating composition (A) used in accordance with the invention is preferably contacted with an electrically conducting anode and with the electrically conductive substrate connected as cathode. Alternatively, the aqueous coating composition (A) does not have to be brought directly into contact with an electrically conducting anode, if the anode, for example, is present separately from the dip-coating bath, as for example via an anion exchange membrane which is permeable for anions.

The passage of electrical current between anode and cathode is accompanied by deposition of a firmly adhering coating film on the cathode, i.e., on the substrate.

Step (1) of the method of the invention is carried out preferably at a dip bath temperature in a range from 20 to 45° C., more preferably in a range from 22 to 42° C., very preferably in a range from 24 to 41° C., especially preferably in a range from 26 to 40° C., with more particular preference in a range from 27 to 39° C., such as in a range from 28 to 38° C., for example. In another preferred embodiment of the method of the invention, step (1) is carried out at a dip bath temperature of not more than 40° C., more preferably not more than 38° C., very preferably not more than 35° C., especially preferably not more than 34° C. or not more than 33° C. or not more than 32° C. or not more than 31° C. or not more than 30° C. or not more than 29° C. or not more than 28° C. In a further, different preferred embodiment of the method of the invention, step (1) is carried out at dip bath temperature ≤32° C. such as, for example, ≤31° C. or ≤30° C. or ≤29° C. or ≤28° C. or ≤27° C. or ≤26° C. or ≤25° C. or ≤24° C. or ≤23° C.

In step (1) of the method of the invention, the aqueous coating composition (A) used in accordance with the invention is preferably applied such that the resulting electrocoat film has a dry film thickness in the range from 5 to 40 μm, more preferably from 10 to 30 μm.

Stages (1a) and (1b) within Step (1)

Step (1) of the method of the invention is carried out in at least two successive stages (1a) and (1b) as follows:

(1a) at an applied voltage in a range from 1 to 50 V, which is applied over a duration of at least 5 seconds, and (1b) at an applied voltage in a range from 50 to 400 V, with the proviso that the voltage applied in stage (1b) is greater by at least 10 V than the voltage applied in stage (1a).

Stages (1a) and (1b) within step (1) of the method of the invention are carried out preferably within a dip-coating bath that is used, comprising the coating composition (A).

Stage (1a)

During the implementation of stage (1a), a corresponding bismuth-enriched layer is formed as preliminary deposition layer on the electrically conductive substrate, this being detectable and quantifiable by X-ray fluorescence analysis, for example. The bismuth here need not necessarily be in trivalent form, but alternatively or additionally may also be present in other oxidation states. This preliminary deposition layer is, in particular, largely free of components (A1) and optionally (A2) and/or (A3) and/or (A5) present in the coating composition. The bismuth-enriched layer formed accordingly preferably exerts a corrosion-preventing effect, the pronouncedness of this effect rising in line with the bismuth layer add-on (in mg of bismuth per $m^2$ of surface area). Preferred layer add-ons are at least 10 or at least 20 or at least 30, more preferably at least 40 or at least 50, and more particularly at least 100 or at least 180, mg of bismuth (calculated as metal) per $m^2$ of surface area.

Stage (1a) is carried out preferably with an applied voltage in a range from 1 to 45 V or in a range from 1 to 40 V or in a range from 1 to 35 V or in a range from 1 to 30 V or in a range from 1 to 25 V or in a range from 1 to 20 V or in a range from 1 to 15 V or in range from 1 to 10 V or in a range from 1 to 5 V. In another preferred embodiment, stage (1a) is carried out with an applied voltage in a range from 2 to 45 V or in a range from 2 to 40 V or in a range from 2 to 35 V or in a range from 2 to 30 V or in a range from 3 to 25 V or in a range from 3 to 20 V or in a range from 3 to 15 V or in a range from 3 to 10 V or in a range from 3 to 6 V.

The voltage applied in stage (1a) is applied over duration of at least 5 seconds, preferably of at least 10 or at least 15 or at least 20 or at least 25 or at least 30 or at least 40 or at least 50 seconds, more preferably of at least 60 or at least 70 or at least 80 or at least 90 or at least 100 seconds, very preferably of at least 110 or at least 120 seconds. The duration here is preferably not more than 300 seconds, more preferably not more than 250 seconds, and more particularly not more than 150 seconds. This duration designates in each case the interval of time during which the voltage in question is maintained during the implementation of stage (1a).

In one preferred embodiment, the voltage applied in stage (1a) is applied over a duration in a range from at least 5 to 500 seconds or from 5 to 500 seconds or from 10 to 500 seconds or from 10 to 300 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

A voltage in a range from 1 to 50 V which is applied during the implementation of stage (1a) over a duration of at least 10 seconds may be set galvanostatically (constantly regulated current). Alternatively, this setting may also be accomplished potentiostatically (constantly regulated voltage), however, with stage (1a) being carried out at a deposition current or in a deposition current range that corresponds to a corresponding voltage in a range from 1 to 50 V. A deposition current of this kind is preferably in a range from 20 to 400 mA, more preferably in a range from 30 to 300 mA or in a range from 40 to 250 mA or in a range from 50 to 220 mA, more particularly in a range from 55 to 200 mA. Such deposition currents within stage (1a) are used preferably when employing substrates which have a surface area in the range from 300 to 500 $cm^2$, more particularly from 350 to 450 $cm^2$ or 395 to 405 $cm^2$.

The deposition current density in stage (1a) is preferably at least 1 $A/m^2$, more preferably at least 2 $A/m^2$, and more particularly at least 3 $A/m^2$, but preferably in each case not more than 20 $A/m^2$, more preferably in each case not more than 10 $A/m^2$.

The deposition current density or the deposition current in stage (1a) here is applied preferably over a duration of at least 5 or at least 10 seconds, preferably at least 15 or at least 20 or at least 25 or at least 30 or at least 40 or at least 50 seconds, more preferably at least 60 or at least 70 or at least 80 or at least 90 or at least 100 seconds, very preferably at least 110 or at least 120 seconds. The duration here is preferably not more than 300 seconds, more preferably not more than 250 seconds, and more particularly not more than 150 seconds. In another preferred embodiment, the deposition current density or deposition current applied in stage (1a) is applied over a duration in a range from at least 10 to 500 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

The voltage or the deposition current or the deposition current density may be kept constant here during the stated duration. Alternatively, however, the voltage or the deposition current or the deposition current density may adopt different values during the deposition duration within stage (1a), within the stated minimum and maximum values in the range from 1 to 50 V, for example, it may swing back and forth or rise in ramp or step form from the minimum to the maximum deposition voltage.

The setting of the voltage or of the deposition current or deposition current density during the implementation of stage (1a) may take place "suddenly", in other words, for example, by appropriately switching over to a rectifier, this requiring a certain technically related minimum period of time in order to attain the target voltage. Alternatively, setting may take place in the form of a ramp, in other words at least approximately continuously and preferably linearly over a selectable period, as for example a period of up to 10, 20, 30, 40, 50, 60, 120, or 300 seconds. Preferred is a ramp of up to 120 seconds, more preferably of up to 60 seconds. A steplike voltage increase is also possible here, in which case preferably a certain hold time at the voltage is observed for each of these voltage stages, of 1, 5, 10, or 20 seconds, for example. Also possible is a combination of ramps and steps.

The setting of the voltage or of the deposition current or deposition current density in stage (1a) may also be regulated in the form of pulses, with times without current or with a voltage below the minimum level between two pulses. The pulse duration may be situated, for example, in the range from 0.1 to 10 seconds. The "period" for the deposition is then considered, preferably, to be the sum total of the durations for which the deposition voltage lies within the aforementioned maximum and minimum values when implementing step (1a). Ramps and pulses may also be combined with one another.

Stage (1b)

During the implementation of stage (1b), the actual dip coating is formed on the preliminary deposition layer obtained after step (1a), by deposition of the dip coating components, more particularly (A1) and optionally (A2) and/or (A5). This coating as well comprises bismuth, in trivalent form or alternatively or additionally in other oxidation states, and this bismuth may act as catalyst in a downstream optional curing step or crosslinking step (6) of the method of the invention. In the production of the coating composition (A), accordingly, it is possible with preference to forgo the incorporation of such a catalyst.

Stage (1b) is preferably carried out at an applied voltage in a range from 55 to 400 V or in a range from 75 to 400 V or in a range from 95 to 400 V or in range from 115 to 390 V or in a range from 135 to 370 V or in a range from 155 to 350 V or in a range from 175 to 330 V or in a range from 195 to 310 V or in a range from 215 to 290 V.

In stage (1b), preferably, in a time interval in the range from 0 to 300 seconds after the end of the implementation of stage (1a), a voltage in the range from 50 to 400 V is applied, preferably relative to an inert counterelectrode, but with the proviso that this voltage applied in stage (1b) is greater by at least 10 V than the voltage applied before in stage (1a). Within the implementation of stage (1b), this voltage is preferably maintained for a time in the range from 10 to 300 seconds, preferably in the range from 30 to 240 seconds, at not less than a value within the stated voltage range from 50 to 400 V, subject to the proviso stated above.

The voltage applied in stage (1b) is preferably applied over a duration of at least 10 seconds or at least 15 or at least 20 or at least 25 or at least 30 or at least 40 or at least 50 seconds, more preferably of at least 60 or at least 70 or at least 80 or at least 90 or at least 100 seconds, very preferably of at least 110 or at least 120 seconds. The duration here is preferably not more than 300 seconds, more preferably not more than 250 seconds, and more particularly not more than 150 seconds. This duration designates in each case the interval of time during which the voltage in question is maintained during the implementation of stage (1b).

In one preferred embodiment, the voltage applied in stage (1b) is applied over a duration in a range from at least 10 to 500 seconds or from at least 20 to 400 seconds or from at least 30 to 300 seconds or from at least 40 to 250 seconds or from at least 50 to 200 seconds, more preferably in a range from at least 60 to 150 seconds or from at least 70 to 140 seconds or from at least 80 to 130 seconds.

The voltage increase from stage (1a) to stage (1b) may take place "suddenly", in other words, for example, by corresponding switching to a rectifier, this requiring a certain technically related minimum time to attain the target voltage. The voltage increase may alternatively take place in the form of a ramp, in other words at least approximately continuously over a selectable period, as for example of up to 10, 20, 30, 40, 50, 60, 120, or 300 seconds. A preferred ramp is of up to 120 seconds, more preferably of up to 60 seconds. Also possible is a voltage increase in steps, in which case certain holding time at the voltage is preferably observed for each of these voltage steps, of 1, 5, 10, or 20 seconds, for example. Also possible is a combination of ramps and steps.

The indication of a period such as, for example, of a period in the range from 10 to 300 seconds for the application of the voltage in stage (1b) in a range from 50 to 400 V may mean that this voltage is held constant during the stated period. Alternatively, however, the voltage may also adopt different values during the deposition time within stage (1b), within the stated minimum and maximum values in the range from 50 to 400 V—for example, it may swing back and forth or increase in a ramp or in steps from the minimum to the maximum deposition voltage.

The voltage, i.e., deposition voltage, in stage (1b) may also be regulated in the form of pulses, with times without current and/or with a deposition voltage below the minimum level between two pulses. The pulse duration may be situated, for example, in the range from 0.1 to 10 seconds. The "period" for the deposition is then considered preferably to be the sum of the durations in which the deposition voltage lies within the stated maximum and minimum levels in the implementation of step (1b). Ramps and pulses may also be combined with one another.

Further Optional Method Steps

The method of the invention optionally further comprises a step (2), preferably following step (1), which as set out above entails two stages (1a) and (1b), as follows:

(2) contacting the substrate at least partly coated with the coating composition (A) with an aqueous sol-gel composition prior to curing of the deposited coating composition (A).

The skilled person knows the terms "sol-gel composition", "sol-gel", and the preparation of sol-gel compositions and sol-gels, from—for example—D. Wang et al., Progress in Organic Coatings 2009, 64, 327-338 or S. Zheng et al., J. Sol-Gel. Sci. Technol. 2010, 54, 174-187.

An aqueous "sol-gel composition" in the sense of the present invention is preferably an aqueous composition prepared by reacting at least one starting compound with water, with hydrolysis and condensation, this starting compound having at least one metal atom and/or semimetal atom such as $M^1$ and/or $M^2$, for example, and having at least two hydrolyzable groups such as, for example, two hydrolyzable groups $X^1$, and further, optionally, having at least one nonhydrolyzable organic radical such as $R^1$, for example. The at least two hydrolyzable groups here are preferably each bonded directly to the at least one metal atom and/or at least one semimetal atom present in the at least one starting compound, in each case by means of a single bond. Because of the presence of the nonhydrolyzable organic radical such as $R^1$, for example, a sol-gel composition of this kind used in accordance with the invention may also be termed a "sol-gel hybrid composition".

The aqueous sol-gel composition used in accordance with the invention in the optional step (2) is preferably obtainable by reaction of at least one compound $Si(X^1)_3(R^1)$,
- where $R^1$ therein is a nonhydrolyzable organic radical which has at least one reactive functional group selected from the group consisting of primary amino groups, secondary amino groups, epoxide groups, and groups which have an ethylenically unsaturated double bond,
- more particularly at least one compound $Si(X^1)_3(R^1)$ where $R^1$ therein is nonhydrolyzable organic radical which has at least one epoxide group as a reactive functional group, and in which $X^1$ is a hydrolyzable group such as an $O-C_{1-6}$ alkyl group, for example, and, moreover,
- optionally at least one further compound $Si(X^1)_3(R^1)$ where therein is a nonhydrolyzable organic radical which has at least one reactive functional group selected from the group consisting of primary amino groups and secondary amino groups, and in which $X^1$ is a hydrolyzable group such as an $O-C_{1-6}$ alkyl group, for example, and optionally at least one compound $Si(X^1)_4$ in which $X^1$ is a hydrolyzable group such as an $O-C_{1-6}$ alkyl group, for example, and optionally at least one compound $Si(X^1)_3(R^1)$,
- where $R^1$ therein is a nonhydrolyzable organic radical which has no reactive functional group, such as a $C_{1-10}$ alkyl radical for example, and in which $X^1$ is a hydrolyzable group such as an $O-C_{1-6}$ alkyl group, for example, and optionally at least one compound $Zr(X^1)_4$ in which $X^1$ is a hydrolyzable group such as an $O-C_{1-6}$ alkyl group, for example, with water.

The method of the invention preferably further comprises a step (3), which preferably follows step (1) or step (2), as follows:

(3) rinsing the substrate coated at least partly with the aqueous coating composition (A), obtainable after step (1) or step (2), with water and/or with ultrafiltrate.

The term "ultrafiltrate" or "ultrafiltration", particularly in connection with electrodeposition coating, is familiar to the skilled person and is defined, for example, in Römpp Lexikon, Lacke und Druckfarben, Georg Thieme Verlag 1998.

The implementation of step (3) permits the recycling of excess constituents of the inventively employed aqueous coating composition (A), present after step (1) on the at least partly coated substrate, into the dip-coating bath.

The method of the invention may further comprise an optional step (4), which preferably follows step (1) or (2) or (3), namely a step of (4) contacting the substrate at least partly coated with the aqueous coating composition (A), obtainable after step (1) or step (2) or step (3), with water and/or ultrafiltrate, preferably over a duration of 30 seconds up to one hour, more preferably over a duration of 30 seconds up to 30 minutes.

The method of the invention may further comprise an optional step (4a), which preferably follows step (1), more particularly stage (1b), or (2) or (3) or (4), namely a step (4a) of (4a) contacting the substrate at least partly coated with the aqueous coating composition (A), obtainable after step (1) or step (2) or step (3) or step (4), with an aqueous solution or dispersion, preferably an aqueous solution, of at least one crosslinking catalyst (V), preferably of at least one crosslinking catalyst (V) which is suitable for crosslinking the reactive functional groups of the binder (A1), more particularly of an epoxide-based polymeric resin and/or acrylate-based polymeric resin used as binder (A1).

The aqueous solution of the at least one crosslinking catalyst (V) is preferably an aqueous solution of bismuth compound such as, for example, an aqueous solution comprising a compound containing trivalent bismuth. During the implementation of the optional step (4a), a cathodic voltage relative to an anode is preferably applied to the electrically conductive substrate used, more preferably in a range from 4 V to 100 V. Carrying out step (4a) permits efficient crosslinking in the case where too small an amount of component (A3) remains in the coating composition after implementation of stage (1a) of step (1) to be deposited in stage (1b).

In one preferred embodiment the method of the invention further comprises at least one step (5), which preferably follows step (1) and/or (2) and/or (3) and/or (4) and/or (4a), but is preferably carried out before an optional step (6), as follows:

(5) applying at least one further coating film to the substrate coated at least partly with the inventively employed aqueous coating composition (A) and obtainable after step (1) and/or (2) and/or (3) and/or (4) and/or (4a).

By means of step (5) it is possible for one or more further coating films to be applied to the substrate at least partly coated with the coating composition (A) and obtainable after step (1) and/or (2) and/or (3) and/or (4) and/or (4a). If two or more coats have to be applied, step (5) may be repeated often accordingly. Examples of further coating films for application are, for example, basecoat films, surfacer films and/or single-coat or multi-coat topcoat films. The aqueous coating composition (A) applied by step (1), optionally after having been subjected to a subsequent rinse with an aqueous sol-gel composition as per step (2) and/or to an optional rinse with water and/or ultrafiltrate (as per step (3)), and/or after step (4) and/or (4a) has been carried out, can be cured, this curing taking place as described below as per step (6), before further coat is applied such as a basecoat film, surfacer film and/or a single-coat or multicoat topcoat film. Alternatively, however, the aqueous coating composition (A) applied by step (1), optionally after having been subjected to a subsequent rinse with an aqueous sol-gel composition as per step (2) and/or to an optional rinse with water and/or ultrafiltrate (as per step (3)), and/or after step (4) and/or (4a) has been carried out, may not be cured, but instead firstly a further coat may be applied such as a basecoat film, surfacer film and/or a single-coat or multicoat topcoat film ("wet-on-wet method"). In this case, following application of this or these further coat(s), the overall system thus obtained is cured, it being possible for this curing to take place as described below, preferably in accordance with a step (6).

In one preferred embodiment the method of the invention further comprises at least one step (6), as follows:

(6) curing the aqueous coating composition (A) applied at least partly to the substrate after step (1) and/or optionally (2) and/or (3) and/or (4) and/or (4a), or the coating applied at least partly to the substrate after step (1) and/or optionally (2) and/or (3) and/or (4) and/or (4a) and/or (5).

Step (6) of the method of the invention is carried out preferably by means of baking after step (1) or optionally (2) or optionally only after at least one further step (5). Step (6) takes place preferably in an oven. The curing here takes place preferably at a substrate temperature in the range from 140° C. to 200° C., more preferably in a range from 150° C. to 190° C., very preferably in a range from 160° C. to 180° C. Step (6) takes place preferably over a duration of at least 2 minutes to 2 hours, more preferably over a duration of at least 5 minutes to 1 hour, very preferably over a duration of at least 10 minutes to 30 minutes.

Use

A further subject of the present invention is a use of the aqueous coating composition (A) used in the method of the invention for at least partly coating an electrically conductive substrate with an electrocoat material.

All preferred embodiments described hereinabove in connection with the aqueous coating composition (A) used in accordance with the invention and with the method of the invention are also preferred embodiments of the aqueous coating composition (A) used in accordance with the invention, in relation to its use for at least partly coating an electrically conductive substrate with an electrocoat material.

At Least Partly Coated Substrate

A further subject of the present invention is an electrically conductive substrate coated at least partly with the aqueous coating composition (A) used in accordance with the invention.

A further subject of the present invention is preferably metallic component or preferably metallic article produced from at least one such substrate.

Such articles may be, for example, metal strips. Components of this kind may be, for example, bodies and body parts of motor vehicles such as automobiles, trucks, motorcycles, buses and coaches, and components of electrical household products, or else components from the area of apparatus claddings, façade claddings, ceiling claddings, or window profiles.

Methods of Determination

1. Salt Spray Mist Testing to DIN EN ISO 9227 NSS

The salt spray mist test is used for determining the corrosion resistance of a coating on a substrate. In accordance with DIN EN ISO 9227 NSS (date: Sep. 1, 2012), the salt spray mist test is carried out for the electrically conductive substrate cold-rolled steel (CRS), coated with an inventive coating composition or with a comparative coating composition. In this test, the samples under analysis are in a chamber in which there is continuous misting with a 5% strength common salt solution at a temperature of 35° C. over a duration of 504 or 1008 hours at a controlled pH in the range from 6.5 to 7.2. The mist deposits on the samples under analysis, covering them with a corrosive film of salt water.

After the salt spray mist test has been carried out according to DIN EN ISO 9227 NSS, the samples may be studied to assess their degree of blistering according to DIN EN ISO 4628-2 (date: Jan. 1, 2004). The assessment is made using characteristic values in the range from 0 (low blistering) to 5 (very severe blistering), with a determination being made of both the frequency and the size of the blisters.

If, still prior to the salt spray mist test to DIN EN ISO 9227 NSS, the coating on the samples under analysis is scored down to the substrate with a blade incision, the samples can be investigated for their level of corrosive undermining to DIN EN ISO 4628-8 (date: Mar. 1, 2013), since the substrate corrodes along the score line during the DIN EN ISO 9227 NSS salt spray mist test. This investigation takes place after the salt spray mist test has been carried out for a duration of 504 or of 1008 hours. As a result of the progressive process of corrosion, the coating is undermined to a greater or lesser extent during the test. The extent of undermining in [mm] is a measure of the resistance of the coating to corrosion.

2. Filiform Corrosion to DIN EN 3665

Determining the filiform corrosion is used to ascertain the corrosion resistance of a coating on a substrate. This determination is carried out to DIN EN 3665 (Aug. 1, 1997) for the electrically conductive substrate aluminum (ALU), coated with an inventive coating composition or with a comparative coating composition, over a duration of 1008 hours. In the course of this time, the coating in question, starting from a line of induced damage to the coating, is undermined by corrosion that takes the form of a line or thread. The maximum thread length in [mm] is measured according to DIN EN 3665 (method 3). The average thread length in [mm] is determined according to PAPP WT 3102 (Daimler) (date: Dec. 21, 2006). The maximum and average thread lengths are a measure of the resistance of the coating to corrosion.

3. VDA Alternating Climate Test to VDA 621-415 [German Automakers Association]

This alternating climate test is used for examining the corrosion resistance of a coating on a substrate. The alternating climate test is carried out for the electrically conductive substrate cold-rolled steel (CRS) coated with a coating composition used in accordance with the invention or with a comparative coating composition. The alternating climate test is carried out in 6 or 10 cycles. One cycle here consists of a total of 168 hours (1 week) and encompasses a) 24 hours of salt spray mist testing as per DIN EN ISO 9227 N (date: Sep. 1, 2012),
 b) followed by 8 hours of storage, including heating, as per DIN EN ISO 6270-2 of September 2005, AHT method,
 c) followed by 16 hours of storage, including cooling, as per DIN EN ISO 6270-2 of September 2005, AHT method,
 d) 3-fold repetition of b) and c) (hence in total 72 hours), and
 e) 48 hours of storage, including cooling, with an aerated climate chamber as per DIN EN ISO 6270-2 of September 2005, AHT method.

If, still prior to the alternating climate test being carried out, the respective baked coating composition on the samples under analysis is scored down to the substrate with a blade incision, the samples can be investigated for their level of corrosive undermining to DIN EN ISO 4628-8, since the substrate corrodes along the score line during the performance of the alternating climate test. As a result of the progressive process of corrosion, the coating is undermined to a greater or lesser extent during the test. The extent of undermining in [mm] is a measure of the resistance of the coating.

4. X-ray Fluorescence Analysis (XFA) for Film Weight Determination

The film weight (in mg per $m^2$ surface area) of the coating under investigation is determined by means of wavelength-dispersive X-ray fluorescence analysis (XFA) according to DIN 51001 (date: August 2003). In this way, for example, the bismuth content or bismuth layer add-on of a coating can be determined, such as, for example, that of the coating obtained after stage (1a) of step (1) of the method of the invention. By analogy it is also possible to determine the respective amount of other elements such as zirconium, for example. The signals obtained when carrying out the X-ray fluorescence analysis are corrected to account for separately measured substrate of an uncoated reference sample. Gross count rates (in kilocounts per second) are determined for each of the elements under analysis, such as bismuth. The gross count rates of the respective elements of a reference sample (uncoated substrate) are subtracted from the respective gross count rates determined in this way for the samples in question, to give the net count rates for the elements under analysis. These are converted, using an element-specific transfer function (obtained from a calibration measurement), into film weights (mg/cm$^2$). Where a number of coats are applied, the respective film weight is determined after each application. Then, for a subsequent coat, the gross count rate of the preceding film in each case counts as a reference. This method of determination is used to determine the bismuth content of the coating obtained after stage (1a) of step (1) of the method of the invention.

5. Alternating Climate Test PV 210

This alternating climate test PV 210 is used for determining the corrosion resistance of a coating on a substrate. The alternating climate test is carried out for the electrically conductive substrate cold-rolled steel (CRS) coated by the method of the invention or by a comparative method. The alternating climate test here is carried out in 30 cycles. One cycle (24 hours) here consists of 4 hours of salt spray mist testing as per DIN EN ISO 9227 NSS (date: Sep. 1, 2012), 4 hours of storage, including cooling, as per DIN EN ISO 6270-2 of September 2005 (AHT method), and 16 hours of storage, including heating, as per DIN EN ISO 6270-2 of September 2005, AHT method, at 40±3° C. and a humidity of 100%. After each 5 cycles there is a pause of 48 hours including cooling as per DIN EN ISO 6270-2 of September 2005, AHT method. 30 cycles therefore correspond to a duration of 42 days in all.

If, still prior to the alternating climate test being carried out, the coating on the samples under analysis is scored down to the substrate with a blade incision, the samples can be investigated for their level of corrosive undermining to DIN EN ISO 4628-8 (date: Mar. 1, 2013), since the substrate corrodes along the score line during the performance of the alternating climate test. As a result of the progressive process of corrosion, the coating is undermined to a greater or lesser extent during the test. The extent of undermining in [mm] is a measure of the resistance of the coating.

After the alternating climate test has been carried out, the samples can be studied to assess their blistering according to DIN EN ISO 4628-2 (date: Jan. 1, 2004). The assessment is made using characteristic values in the range from 0 (low blistering) to 5 (very severe blistering).

6. Determination of the Sieve Residue 200 mL of a total of 5 L of the coating composition (A) or of a comparative composition are measured out at the chosen dip bath temperature in a 350 mL plastic beaker (plastic beaker R 350 from Kautex, base diameter 7 cm) (up to the fourth line from bottom) and are immediately poured all at once into the sieve produced, this sieve being produced by clamping a weighed sieve fabric (10×10 cm nylon sieve No. 11, mesh size 31 μm) between two beakers inserted one inside the other (plastic beakers R 350 from Kautex, base diameter 7 cm). The flow time is determined from the start of introduction to the end of flow. The remainder of the 5 L batch is then poured through the sieve beaker. The pail is rinsed with deionized water until there are no longer any residues adhering in the pail. The rinsing water is likewise poured through the sieve beaker. Clogging of the sieve can be prevented by tapping from the side using a stirring rod or the like. A spray bottle filled with deionized water is used to rinse sieve fabric and sieve residue thoroughly, and the sieve fabric is then removed from the plastic beakers and placed, fixed in turn by paper clip, to the lid, which has been weighed beforehand, and the assembly is dried at 60° C. for 90 minutes. The can lid with the sieve is then weighed again, thus giving the sieve residue. For stable materials, the flow time of the sieve sample is <20 s (OK). The sieve residue is reported in mg per 1 L bath material. A sieve residue of <50 mg/L is identified as good, while a sieve residue of >50 mg/L is identified as objectionable.

7. Atomic Emission Spectrometry (ICP-OES) for Determining the Total Amount of Bismuth Present in the Coating Composition (A)

The amount of certain elements in a sample under analysis, such as the bismuth content, for example, is determined using inductively coupled plasma atomic emission spectrometry (ICP-OES) according to DIN EN ISO 11885 (date: September 2009). For this purpose, a sample of coating composition (A) or of comparative composition is taken and this sample is digested by microwave: here, a sample of the coating composition (A) or of a comparative composition is weighed out, and the volatile constituents of this sample are removed by heating with a linear temperature increase from 18° C. to 130° C. over the course of an hour. An amount of up to 0.5 g of this resulting sample is admixed with a 1:1 mixture of nitric acid (65% strength) and sulfuric acid (96% strength) (5 mL of each of said acids) and then microwave digestion is carried out using an instrument from Berghof (Speedwave IV instrument). During the digestion, the sample mixture is heated to a temperature of 250° C. over 20 to 30 minutes, and this temperature is held for 10 minutes. Following the digestion, the remaining sample mixture should be a clear solution without solids fraction. Using ICP-OES according to DIN EN ISO 11885, the total amount of bismuth in the sample in then ascertained. This sample is subjected to thermal excitation in an argon plasma generated by high-frequency field, and the light emitted due to electron transitions becomes visible as a spectral line of the corresponding wavelength, and is analyzed using an optical system. There is a linear relation between the intensity of the light emitted and the concentration of the element in question, such as bismuth. Prior to implementation, using known element standards (reference standards), the calibration measurements are carried out as a function of the particular sample under analysis. These calibrations can be used to determine concentrations of unknown solutions such as the concentration of the amount of bismuth, such as the amount of trivalent bismuth (A4), for example, in the sample.

The examples which follow serve to elucidate the invention, but should not be interpreted as imposing any restriction.

Unless otherwise noted, the figures in percent hereinafter are in each case percentages by weight.

INVENTIVE AND COMPARATIVE EXAMPLES

1. Production of Inventively Employed Aqueous Coating Compositions (Z1, Z2, Z3, Z4, and Z5) and of an Aqueous Comparative Coating Composition (Z6)

An aqueous dispersion of a binder and crosslinking agent (commercially available product CathoGuard® 520 from BASF with a solids content of 37.5 wt %), a pigment paste (commercially available product CathoGuard® 520 from BASF with a solids content of 65.0 wt %), and fractions of deionized water are combined to form a comparative coating composition (Z6) and mixed with stirring at room temperature (18-23° C.). A total of 2275 g of CathoGuard® 520, 295 g of CathoGuard® 520 pigment paste, and 2430 g of deionized water are used here. The CathoGuard® 520 pigment paste from BASF that is used for producing Z6 contains bismuth subnitrate.

The inventively employed aqueous coating compositions (Z1, Z2, Z3, Z4, and Z5) are produced in the same way as for the comparative coating composition (Z6), with the difference that instead of the commercially available pigment paste CathoGuard® 520 from BASF, a pigment paste P1 is used, and that additionally water-soluble, bismuth(III)-containing compound is incorporated during production into each of the aqueous coating compositions (Z1, Z2, Z3, Z4, and Z5). The pigment paste P1 used is produced according to the method described in DE 10 2008 016 220 A1, page 7 table 1, variant B, but in the present case no bismuth subnitrate is used in producing the pigment paste P1. The pigment paste P1 therefore contains no bismuth subnitrate. The water-soluble, bismuth(III)-containing compound used is either bismuth L-(+)-lactate (Bi1), with a bismuth content of 11.7 wt %, or bismuth lactate (Bi2), the lactate component being a mixture of D- and L-lactate, with a bismuth content of 9.2 wt %, or bismuth dimethylpropionate (Bi3), with a bismuth content of 11.9 wt %.

Here, in total, 2130 g of CathoGuard® 520, 306 g of P1, 2496 g of deionized water, and 68 g of Bi1 in the case of (Z1)

2130 g of CathoGuard® 520, 306 g of P1, 2477 g of deionized water, and 87 g of Bi2 in the case of (Z2)

2215 g of CathoGuard® 520, 295 g of P1, 2430 g of deionized water, and 60 g of Bi3 in the case of (Z3)

2215 g of CathoGuard® 520, 295 g of P1, 2410 g of deionized water, and 80 g of Bi3 in the case of (Z4)

2215 g of CathoGuard® 520, 295 g of P1, 2390 g of deionized water, and 100 g of Bi3 in the case of (Z5)

are used.

The production of Bi1, Bi2, and Bi3 is as described below:

Production of Bi1

A mixture of L-(+)-lactic acid (88 wt % strength) (613.64 g) and deionized water (1314.00 g) is introduced and heated to 70° C. with stirring. 155.30 g of bismuth(III) oxide are added to this mixture, during which the temperature of the resultant mixture may climb to up to 80° C. After an hour, a further 155.30 g of bismuth(III) oxide are added to this mixture, during which the temperature of the resultant mixture may again climb to up to 80° C. After a further hour, a further 155.30 g of bismuth(III) oxide are added to this mixture, and the resulting mixture is stirred for 3 hours more. Then 1003 g of deionized water are added with stirring. After this period, the resultant mixture is optionally cooled to a temperature in the range from 30 to 40° C., if that temperature has not already been reached. The reaction mixture is subsequently filtered (T1000 depth filter) and the filtrate is used as Bi1.

Production of Bi2

Production is in accordance with the method described for Bi1, with the difference that, instead of L-(+)-lactic acid, 901.00 g of lactic acid (mixture of D- and L-lactic acid) in 2000 g of deionized water are introduced. Moreover, after the end of the addition of bismuth(III) oxide and three hours of stirring, 1858 g of deionized water are added.

Production of Bi3

Production is in accordance with the method described for Bi1, with the difference that, instead of L-(+)-lactic acid, 469.00 g of dimethylpropionic acid in 1077 g of deionized water are introduced. The addition of bismuth(III) oxide takes place analogously in three batches, but using 77.67 g of bismuth(III) oxide per batch. Moreover, the mixture obtained after the end of the addition of bismuth(III) oxide and three hours of stirring is filtered, after optional cooling to temperature in the range from 30 to 40° C., directly, without further addition of deionized water.

Table 1 gives an overview of the resultant inventive aqueous coating compositions Z1, Z2, Z3, Z4, and Z5 and of the aqueous comparative coating composition Z6:

TABLE 1

|  | Inventive examples Z1-Z5 and comparative example Z6 | | | | | |
| --- | --- | --- | --- | --- | --- | --- |
|  | Z1 | Z2 | Z3 | Z4 | Z5 | Z6* |
| CathoGuard ® 520/wt % | 42.60 | 42.60 | 44.30 | 44.3 | 44.3 | 45.50 |
| Bi1/wt % | 1.37 | — | — | — | — | — |
| Bi2/wt % | — | 1.74 | — | — | — | — |
| Bi3/wt % | — | — | 1.20 | 1.60 | 2.00 | — |
| Deionized water/wt % | 49.91 | 49.54 | 48.60 | 48.20 | 47.80 | 48.60 |
| Pigment paste CathoGuard ® 520/wt % | — | — | — | — | — | 5.90 |
| Pigment paste P1/wt % | 6.12 | 6.12 | 5.9 | 5.9 | 5.9 | — |
| pH | 5.93 | 5.52 | 5.52 | 5.30 | 5.30 | 5.30 |
| Conductivity/mS/cm | 2.35 | 2.23 | 2.50 | 2.70 | 2.40 | 2.19 |

*= not inventive

The respective pH values and the conductivities are determined at a temperature of Z1-Z5 and Z6 in the range from 17.5 to 20.9° C.

2. Production Coated Electrically Conductive Substrates by Means of One of the Inventively Employed Aqueous Coating Compositions Z1-Z5 or of the Comparative Coating Composition Z6

The aqueous coating compositions Z1-Z5 and also the comparative coating composition Z6 are each applied as dip coatings to different substrates. Each of the compositions Z1-Z5 and Z6 is applied to the different substrates directly after its production.

Three kinds of metal test panels are used in each case, these being T1 (hot dip-galvanized steel (HDG)) and T2 (aluminum (ALU)) and also T3 (cold-rolled steel (CRS)) as examples of electrically conductive substrates. Each side of the respective panels used has an area of 10.5 cm·19 cm, giving an overall area of around 400 cm².

They are first of all cleaned in each case by immersion of the panels into a bath containing an aqueous solution comprising the commercially available products Ridoline 1565-1 (3.0 wt %) and Ridosol 1400-1 (0.3 wt %) from Henkel, and also water (96.7 wt %), for a time of 1.5 to 3 minutes at a temperature of 62° C. This is followed by mechanical cleaning (using fine brushes), after which the panels are again immersed into the bath for a time of 1.5 minutes.

The substrates cleaned in this way are subsequently rinsed with water (for a time of 1 minute) and with deionized water (for a time of 1 minute).

Immediately thereafter, one of the inventively employed aqueous coating compositions Z1 to Z5, or its comparative counterpart Z6, is applied to each panel T1, T2, and T3, respectively, with the respective panel being immersed in each case into a corresponding dip-coating bath comprising one of the compositions Z1 to Z5 or Z6. The dip-coating bath here has a respective bath temperature of 32° C. or 38° C. (32° C. in the case of each of Z1, Z2 and Z6 and 38° C. in the case of each of Z3 to Z5). The stirring speed in each case is 300 revolutions per minute (in the case of Z1, Z2 and Z6), 1400 revolutions per minute (in the case of Z3), 1900 revolutions per minute (in the case of Z4), or 2400 revolutions per minute (in the case of Z5).

Coating in the dip-coating bath is carried out according to one of two method alternatives a) or b), with the method parameters of the individual alternatives being selected such that after the coating step or deposition step has been carried out, and after subsequent baking, a dry film thickness of 20 μm is achieved in each case. Method alternative a) is a noninventive method alternative, whereas method alternative b) is inventive.

Method Alternatives a) and b) are Elucidated Below:

Method Alternative a) (Not Inventive)

Method alternative a) envisages a deposition step or coating step in which first of all within a time interval of 10 seconds a voltage of 260 V is set, and is then maintained for a duration y (hold time y), to give a coating on the respective substrate in a dry film thickness of 20 μm. The voltage of 260 V is set by raising the voltage in a continuous line, by means of a voltage ramp, from 0 V to 260 V within the stated time interval of 10 seconds. A voltage of 52 V, i.e., voltage >50 V, is therefore achieved after just 2 seconds.

Method Alternative b) (Inventive)

Method alternative b) envisages a two-stage deposition step or coating step, in which first of all a voltage of 4 V is applied over a duration of 120 seconds (corresponding to stage (1a)). Thereafter the applied voltage is raised in a continuous line from 4 V to 260 V or to 240 V or to 220 V over a duration of in each case 10 seconds, by means of a voltage ramp. This voltage of 260 V or 240 V or 220 V is then maintained for a duration x (hold time x), giving a coating on the respective substrate in a dry film thickness of 20 μm.

Coating of panels T1, T2, and T3 with the inventively employed aqueous coating compositions Z1 and Z2, or with the comparative coating composition Z6, takes place in each case by means of each of method alternatives a) and b). Coating of panels T1, T2 and T3 with the aqueous coating composition Z3, Z4 or Z5 takes place in each case only by means of inventive method alternative b).

The subsequent baking step takes place such that the coatings obtained are baked in each case at 175° C. (oven temperature) for a time of 25 minutes.

In total, accordingly, 27 coated substrates different from one another are obtained. Tables 2a, 2b, 2c, 2d, and 2e provide an overview of the resulting coated substrates.

TABLE 2a

Coated substrates as per inventive method alternative b)

|  | Inv. Ex. T1Z1b* | Inv. Ex. T1Z2b+ | Inv. Ex. T1Z3b− | Inv. Ex. T1Z4b' | Inv. Ex. T1Z5b− | Comp. Ex. T1Z6b# |
|---|---|---|---|---|---|---|
| Substrate | T1 (HDG) | T1 (HDG) | T1 (HDG) | T1 (HDG) | T1 (HDG) | T1 (HDG) |
| Aqueous coating composition used | Z1 | Z2 | Z3 | Z4 | Z5 | Z6 |
| Current range Stage (1a), i.e., at a voltage of 4 V over 120 s/mA | 59-130 | 62-154 | 70-170 | 84-182 | 91-184 | 36-78 |

*Duration x = 135 s at 260 V
+Duration x = 120 s at 260 V
−Duration x = 90 s at 220 V
'Duration x = 90 s at 240 V
Duration x = 60 s at 260 V TABLE 2b Coated substrates as per inventive method alternative b)

|  | Inv. Ex. T2Z1b* | Inv. Ex. T2Z2b+ | Inv. Ex. T2Z3b− | Inv. Ex. T2Z4b' | Inv. Ex. T2Z5b− | Comp. Ex. T2Z6b# |
|---|---|---|---|---|---|---|
| Substrate | T2 (ALU) | T2 (ALU) | T2 (ALU) | T2 (ALU) | T2 (ALU) | T2 (ALU) |
| Aqueous coating composition used | Z1 | Z2 | Z3 | Z4 | Z5 | Z6 |
| Current range Stage (1a), i.e., at a voltage of 4 V over 120 s/mA | 59-130 | 62-154 | 70-170 | 84-182 | 91-184 | 36-78 |

*Duration x = 135 s at 260 V
+Duration x = 120 s at 260 V
−Duration x = 90 s at 220 V
'Duration x = 90 s at 240 V
Duration x = 60 s at 260 V TABLE 2c Coated substrates as per inventive method alternative b)

|  | Inv. Ex. T3Z1b* | Inv. Ex. T3Z2b+ | Inv. Ex. T3Z3b− | Inv. Ex. T3Z4b' | Inv. Ex. T3Z5b− | Comp. Ex. T3Z6b# |
|---|---|---|---|---|---|---|
| Substrate | T3 (CRS) | T3 (CRS) | T3 (CRS) | T3 (CRS) | T3 (CRS) | T3 (CRS) |
| Aqueous coating composition used | Z1 | Z2 | Z3 | Z4 | Z5 | Z6 |
| Current range Stage (1a), i.e., at a voltage of 4 V over 120 s/mA | 59-130 | 62-154 | 70-170 | 84-182 | 91-184 | 36-78 |

*Duration x = 135 s at 260 V
+Duration x = 120 s at 260 V
−Duration x = 90 s at 220 V
'Duration x = 90 s at 240 V
Duration x = 60 s at 260 V TABLE 2d Coated substrates as per noninventive method alternative a)

|  | Comp. Ex. T1Z1a* | Comp. Ex. T1Z2a+ | Comp. Ex. T1Z6a# | Comp. Ex. T2Z1a* | Comp. Ex. T2Z2a+ | Comp. Ex. T2Z6a# |
|---|---|---|---|---|---|---|
| Substrate | T1 (HDG) | T1 (HDG) | T1 (HDG) | T2 (ALU) | T2 (ALU) | T2 (ALU) |
| Aqueous coating composition used | Z1 | Z2 | Z6 | Z1 | Z2 | Z6 |

*Duration y = 90 s
+Duration y = 45 s
Duration y = 60 s

TABLE 2e

Coated substrates as per noninventive method alternative a)

|  | Comp. Ex. T3Z1a* | Comp. Ex. T3Z2a+ | Comp. Ex. T3Z6a# |
|---|---|---|---|
| Substrate | T3 (CRS) | T3 (CRS) | T3 (CRS) |
| Aqueous coating composition used | Z1 | Z2 | Z6 |

*Duration y = 90 s
+Duration y = 45 s
Duration y = 60 s

The dry film thicknesses of the inventive aqueous coating compositions or comparative coating compositions, baked onto the respective substrates, are in each case 20 μm.

The bismuth layer add-on (in mg of bismuth per m² of surface area) of the coating applied by stage (1a) of step (1) of the inventive method (corresponding to the first deposition at 4 V over 120 s within method variant b)) may be determined by means of x-ray fluorescence analysis.

Table 2f gives a corresponding overview:

| Inventive/comparative example | Bismuth content in [mg/m²] |
|---|---|
| Inv. Example T1Z1b | 79 |
| Inv. Example T1Z2b | 73 |
| Inv. Example T1Z3b | 29 |
| Inv. Example T1Z4b | 48 |
| Inv. Example T1Z5b | 136 |
| Comp. Example T1Z6b | 0 |
| Inv. Example T2Z1b | 18 |
| Inv. Example T2Z2b | 27 |
| Inv. Example T2Z3b | 21 |
| Inv. Example T2Z4b | 37 |
| Inv. Example T2Z5b | 34 |
| Comp. Example T2Z6b | 0 |
| Inv. Example T3Z1b | 48 |
| Inv. Example T3Z2b | 61 |
| Inv. Example T3Z3b | 40 |
| Inv. Example T3Z4b | 69 |
| Inv. Example T3Z5b | 95 |
| Comp. Example T3Z6b | 5 |

As can be seen from table 2f, with all of the inventively employed coating compositions it is possible to obtain a coating of at least 18 mg/m² Bi and up to 136 mg/m² Bi.

3. Investigation of the Corrosion Prevention Effect of the Coated Substrates

All of the tests below were carried out in accordance with the aforementioned methods of determination and/or with the corresponding standard. Each value in table 3a, 3b, 3c, or 3d is the average value (with standard deviation) from a triple determination.

TABLE 3a

|  | Comp. Ex. T3Z1a | Inv. Ex. T3Z1b | Comp. Ex. T3Z2a | Inv. Ex. T3Z2b | Comp. Ex. T3Z6a | Comp. Ex. T3Z6b |
|---|---|---|---|---|---|---|
| Undermining [mm] according to DIN EN ISO 4628-8 after 504 h of salt spray mist testing to DIN EN ISO 9227 NSS | 3.0 | 1.5 | 2.8 | 1.2 | 4.1 | 4.1 |
| Undermining [mm] according to DIN EN ISO 4628-8 after 1008 h of salt spray mist testing to DIN EN ISO 9227 NSS | 7.1 | 3.3 | 6.9 | 4.2 | 7.9 | 8.0 |

TABLE 3b

|  | Inv. Ex. T3Z3b | Inv. Ex. T3Z4b | Inv. Ex. T3Z5b |
|---|---|---|---|
| Undermining [mm] according to DIN EN ISO 4628-8 after 1008 h of salt spray mist testing to DIN EN ISO 9227 NSS | 5.0 | 2.2 | 1.8 |

TABLE 3c

|  | Comp. Ex. T3Z1a | Inv. Ex. T3Z1b | Comp. Ex. T3Z2a | Inv. Ex. T3Z2b | Comp. Ex. T3Z6a | Comp. Ex. T3Z6b |
|---|---|---|---|---|---|---|
| Undermining [mm] according to DIN EN ISO 4628-8 after 6 cycles of a VDA alternating climate test to VDA 621-415 | 6.0 | 3.2 | 6.2 | 3.3 | 7.2 | 7.0 |
| Undermining [mm] according to DIN EN ISO 4628-8 after 10 cycles of a VDA alternating climate test to VDA 621-415 | 12.2 | 5.9 | 12.7 | 7.5 | 12.7 | 12.8 |

TABLE 3d

|  | Comp. Ex. T2Z1a | Inv. Ex. T2Z1b | Comp. Ex. T2Z2a | Inv. Ex. T2Z2b | Comp. Ex. T2Z6a | Comp. Ex. T2Z6b |
|---|---|---|---|---|---|---|
| Maximum thread length [mm] according to DIN EN 3365 after 1008 h | 8.9 | 8.7 | 10.1 | 9.5 | 12.6 | 12.4 |

TABLE 3d-continued

|  | Comp. Ex. T2Z1a | Inv. Ex. T2Z1b | Comp. Ex. T2Z2a | Inv. Ex. T2Z2b | Comp. Ex. T2Z6a | Comp. Ex. T2Z6b |
|---|---|---|---|---|---|---|
| Average thread length [mm] according to PAPP WT 3102 after filiform corrosion to DIN EN 3365 after 1008 h | 6.8 | 4.6 | 6.5 | 5.1 | 8.9 | 7.5 |

As is apparent from tables 3a, 3b and 3c, and 3d, the substrates coated by the inventive method with an inventively employed aqueous coating composition, in comparison to the comparative examples, consistently show an improved corrosion prevention effect. In particular, for example, it can be seen that the undermining in [mm] after implementation of the VDA alternating climate test according to VDA 621-415 (inventive example T3Z1b versus comparative example T3Z1a), and after implementation of salt spray mist testing to DIN EN ISO 9227 NSS (inventive example T3Z2b versus comparative example T3Z2a), can be more than 50% lower.

4. Further Comparative Experiments Relative to Substrates Produced by the Method of EP 1884 579 A1

EP 1 884 579 A1 discloses method for coating electrically conductive substrates, and envisages two-stage electrical deposition of a coating material on the substrate. The coating composition used in that case, unlike the inventively employed coating composition (A), necessarily includes a zirconium compound in an amount of 30 to 20 000 ppm, and may optionally comprise further compounds containing metal atoms, such as a bismuth compound, for example. Hereinafter it is shown that both with zirconium-containing coating compositions used in the method of EP 1 884 579 A1, and with corresponding coating compositions comprising a combination of a zirconium compound and a bismuth compound, it is not possible to achieve adequate corrosion prevention.

4.1 Production of Inventively Employed Aqueous Coating Compositions and Aqueous Comparative Coating Compositions Experimental Series 1

The aqueous comparative coating compositions (Z7) and (Z8) are produced in accordance with the process described in section 1. (with the heading "Inventive and comparative examples").

Used in total in this case are
1015 g of CathoGuard® 520, 135 g of CathoGuard® 520 pigment paste, 11 g of additive, 3826.6 g of deionized water, and 12.4 g of Zr1 (corresponding to 500 ppm of zirconium) in the case of (Z7), and
1015 g of CathoGuard® 520, 135 g of CathoGuard® 520 pigment paste, 11 g of additive, 3805.6 g of deionized water, and 12.4 g of Zr1 (corresponding to 500 ppm of zirconium) and 21.0 g of Bi1 (corresponding to 500 ppm of bismuth) in the case of (Z8).

"Zr1" used is commercially available hexafluorozirconic acid from Henkel AG & Co. KGaA (containing 45 wt % Zr, based on Zr as metal). The additive used is an aqueous solution of a poly(vinyl alcohol-co-vinyl acetate) available commercially from Clariant (Mowiol® 47-88), which may be prepared as described on page 12, example 4.1, of European patent EP 1 192 226 B1.

Table 4a gives an overview of the resulting aqueous comparative coating compositions Z7 and Z8:

| Comparative coating compositions Z7 and Z8 | Z7* | Z8* |
|---|---|---|
| CathoGuard ® 520/wt % | 20.30 | 20.30 |
| Bi1/wt % | — | 0.42 |
| Zr1/wt % | 0.25 | 0.25 |
| Deionized water/wt % | 76.53 | 76.11 |
| Pigment paste CathoGuard ® 520/wt % | 2.70 | 2.70 |
| Additive/wt % | 0.22 | 0.22 |
| pH | 4.60 | 4.30 |
| Solids content/wt % | 9.90 | 9.90 |
| Conductivity/mS/cm | 1.66 | 1.46 |

*= not inventive

Experimental Series 2

The inventively employed aqueous coating composition (Z9) and also the aqueous comparative coating composition (Z10) are produced in accordance with the process described in section 1. (with the heading "Inventive and comparative examples").

Used in total in this case are
2215 g of CathoGuard® 520, 295 g of CathoGuard® 520 pigment paste, 24 g of additive, 2397.6 g of deionized water, and 68.4 g of Bi1 (corresponding to 1600 ppm of bismuth) in the case of (Z9), and
2215 g of CathoGuard® 520, 295 g of CathoGuard® 520 pigment paste, 24 g of additive, 2425.6 g of deionized water, and 40.4 g of Zr1 (corresponding to 1600 ppm of zirconium) in the case of (Z10).

Table 4b provides an overview of the resulting inventively employed aqueous coating composition Z9 and of the aqueous comparative coating composition Z10: Coating compositions Z9 and comparative coating composition Z10

| Coating compositions Z9 and comparative coating composition Z10 | Z9 | Z10* |
|---|---|---|
| CathoGuard ® 520/wt % | 44.30 | 44.30 |
| Bi1/wt % | 1.37 | — |
| Zr1/wt % | — | 0.81 |
| Deionized water/wt % | 47.95 | 48.51 |
| Pigment paste CathoGuard ® 520/wt % | 5.90 | 5.90 |
| Additive/wt % | 0.48 | 0.48 |
| pH | 4.80 | 4.70 |
| Solids content/wt % | 21.70 | 21.70 |
| Conductivity/mS/cm | 2.95 | 2.20 |

*= not inventive 4.2. Production of Coated Electrically Conductive Substrates Using Inventively Employed Aqueous Coating Composition Z9 or Comparative Coating Compositions Z7, Z8, or Z10

The aqueous comparative coating compositions Z7, Z8, or Z10 and the inventively employed coating composition Z9 are each applied as dip-coatings to various substrates in accordance with the production method described under 2. (of the heading "Inventive and comparative examples"), but with the difference that the dip-coating bath has a temperature in each case of 28° C. (Z7), 30° C. (Z8), or 32° C. (Z9 and Z10).

Furthermore, instead of one of method alternatives a) or b), coating takes place according to one of the inventive method variants c) (for Z7 and Z8) or d) (for Z9 and Z10) described below.

Method Alternative c) (Inventive Method Variant)

Method alternative c) provides for a two-stage deposition step or coating step in which first of all a first current setting is established galvanostatically at 80 mA over a duration of 60 seconds (corresponding to stage (1a)). Thereafter, the applied voltage corresponding to this current strength is raised in a continuous line, by means of a voltage ramp, to 280 V over a duration of 10 seconds. This voltage of 280 V is then maintained for a duration x (hold time x) (stage 1b)), producing a coating on the respective substrate in a dry film thickness of 20 μm. Stage (1a) is therefore carried out galvanostatically, and stage (1b) potentiostatically.

Method Alternative d) (Inventive Method Variant)

Method alternative d) provides for a two-stage deposition step or coating step in which first of all a first current setting is established galvanostatically at 180 mA over a duration of 120 seconds (corresponding to stage (1a)). Thereafter, the applied voltage corresponding to this current strength is raised in continuous line, by means of a voltage ramp, to 200 V over a duration of 10 seconds. This voltage of 200 V is then maintained for a duration x (hold time x) (stage 1b)), producing a coating on the respective substrate in a dry film thickness of 20 μm. Stage (1a) is therefore carried out galvanostatically, and stage (1b) potentiostatically.

In total, in this way, 12 coated substrates different from one another are obtained. Tables 4c, 4d, and 4e provide an overview of the resulting coated substrates.

TABLE 4c

Coated substrates as per inventive method alternative c) or d)

|  | Comp. Ex. T1Z7c* | Comp. Ex. T1Z8c* | Inv. Ex. T1Z9d# | Comp. Ex. T1Z10d# |
|---|---|---|---|---|
| Substrate | T1 (HDG) | T1 (HDG) | T1 (HDG) | T1 (HDG) |
| Aqueous coating composition used | Z7 | Z8 | Z9 | Z10 |
| Voltage range stage (1a), i.e., at a current of 80 mA (Z7, Z8) or 180 mA (Z9, Z10)/V | 4-5 | 3.5-5 | 4-5 | 5-6.5 |

*Duration x = 120 s at 280 V
Duration x = 120 s at 200 V

TABLE 4d

Coated substrates as per inventive method alternative c) or d)

|  | Comp. Ex. T2Z7c* | Comp. Ex. T2Z8c* | Inv. Ex. T2Z9d# | Comp. Ex. T2Z10d# |
|---|---|---|---|---|
| Substrate | T2 (ALU) | T2 (ALU) | T2 (ALU) | T2 (ALU) |
| Aqueous coating composition used | Z7 | Z8 | Z9 | Z10 |
| Voltage range stage (1a), i.e., at a current of 80 mA (Z7, Z8) or 180 mA (Z9, Z10)/V | 4-5 | 3.5-5 | 4-5 | 5-6.5 |

*Duration x = 120 s at 280 V
Duration x = 120 s at 200 V

TABLE 4e

Coated substrates as per inventive method alternative c) or d)

|  | Comp. Ex. T3Z7c* | Comp. Ex. T3Z8c* | Inv. Ex. T3Z9d# | Comp. Ex. T3Z10d# |
|---|---|---|---|---|
| Substrate | T3 (CRS) | T3 (CRS) | T3 (CRS) | T3 (CRS) |
| Aqueous coating composition used | Z7 | Z8 | Z9 | Z10 |
| Voltage range stage (1a), i.e., at a current of 80 mA (Z7, Z8) or 180 mA (Z9, Z10)/V | 4-5 | 3.5-5 | 4-5 | 5-6.5 |

*Duration x = 120 s at 280 V
Duration x = 120 s at 200 V

The dry film thicknesses of the inventive aqueous coating compositions and comparative coating compositions baked onto the respective substrates are 20 μm in each case.

The bismuth layer add-on (in mg of bismuth per $m^2$ of surface area) and also the zirconium layer add-on (in mg of zirconium per $m^2$ of surface area) of the coating applied by stage (1a) of stage (1) of the inventive method (corresponding to the first deposition within method variant d) or e)) may be determined by x-ray fluorescence analysis in accordance with the method of determination above. The zirconium layer add-on is determined by analogy with the method for determining the bismuth layer add-on.

Table 4f provides a corresponding overview:

| Inventive/comparative example | Bismuth content in [mg/m$^2$] | Zirconium content in [mg/m$^2$] |
|---|---|---|
| Comp. Example T1Z7c | 0 | 1.0 |
| Comp. Example T1Z8c | 0 | 1.0 |
| Inv. Example T1Z9d | 54.0 | 0.0 |
| Comp. Example T1Z10d | 0 | 3.0 |
| Comp. Example T2Z7c | 0 | 1.2 |
| Comp. Example T2Z8c | 1.2 | 0 |
| Inv. Example T2Z9d | 40.4 | 0 |
| Comp. Example T2Z10d | 0.3 | 2.1 |
| Comp. Example T3Z7c | 0 | 0.7 |
| Comp. Example T3Zc | 0 | 0 |
| Inv. Example T3Z9d | 59.1 | 0.5 |
| Comp. Example T3Z10d | 0 | 0.5 |

As is apparent from table 4f, a significant coating with Bi can be achieved only with the inventively employed coating composition Z9, this level of coating being, in particular, at least 40 mg/m$^2$ Bi.

5. Investigation of the Corrosion Prevention Effect of the Coated Substrates

All of the tests below were carried out in accordance with the aforementioned methods of determination and/or with the corresponding standard. Each value in table 5a or 5b is the average value (with standard deviation) from a double determination.

TABLE 5a

|  | Comp. Ex. T3Z7c | Comp. Ex. T3Z8ca | Inv. Ex. T3Z9td | Comp. Ex. T3Z10d |
|---|---|---|---|---|
| Substrate | T3 (CRS) | T3 (CRS) | T3 (CRS) | T3 (CRS) |
| Undermining [mm] according to DIN EN ISO 4628-8 after 504 h of salt spray mist testing to DIN EN ISO 9227 NSS | 5.3 | 6.6 | 1.9 | 5.5 |
| Undermining [mm] according to DIN EN ISO 4628-8 after 1008 h of salt spray mist testing to DIN EN ISO 9227 NSS | 9.0 | 10.7 | 3.0 | 10.6 |
| Undermining [mm] according to DIN EN ISO 4628-8 after 30 cycles of alternating climate test PV 210 | 10.1 | 9.5 | 3.8 | 9.1 |
| Undermining [mm] according to DIN EN ISO 4628-8 after 10 cycles of VDA alternating climate test to VDA 621-415 | 14.7 | 14.0 | 6.5 | 15.2 |
| Degree of blistering according to DIN EN ISO 4628-2 after 10 cycles of VDA alternating climate test to VDA 621-415 | 1 (S5) 4 (S2-5) | 0 (S0) 2 (S2-5) | 0 (S0) 1 (S2) | 4 (S2) 3 (S4) |

TABLE 5b

| Inventive/comparative example | Sieve residue [g/L] | Assessment |
|---|---|---|
| Z7 | 0.004 | ok |
| Z8 | 0.051 | not ok |
| Z9 | 0.001 | ok |
| Z10 | 21.003 | not ok | ok = satisfactory

As can be seen from table 5a, the substrate coated by the inventive method with an inventively employed aqueous coating composition, in comparison to the comparative examples, consistently shows an improved corrosion prevention effect. It is also evident from table 5b that the inventively employed coating composition Z9, especially in contrast to Z10, is distinguished by sufficient stability, on the basis of just a small sieve residue.

What is claimed is:

1. A method for at least partly coating an electrically conductive substrate with an electrocoat material, the method comprising: at least
    (1) contacting the electrically conductive substrate, connected as cathode, with an aqueous coating composition (A),
        wherein said contacting (1) is carried out in at least two successive stages (1a) and (1b):
        (1a) at an applied voltage in a range from 1 to 50 V, which is applied over a duration of at least 5 seconds, and
        (1b) at an applied voltage in a range from 50 to 400 V, with the proviso that the voltage applied in stage (1b) is greater by at least 10 V than the voltage applied in stage (1a),
    wherein the aqueous coating composition (A) comprises
        (A1) at least one cathodically depositable binder,
        (A2) optionally at least one crosslinking agent,
        (A3) at least one organic monocarboxylic or polycarboxylic acid comprising no nitrogen atom(s), and/or anions thereof, and
        (A4) a trivalent bismuth cation,
        the at least one organic monocarboxylic or polycarboxylic acid (A3) and/or anions thereof and the trivalent bismuth cation as component (A4) each being present in the aqueous coating composition (A) in an amount such that their stoichiometry to one another allows at least 50 mol % of the trivalent bismuth cation to be present in the form of a salt and/or complex of components (A3) and (A4),
    wherein
    a ratio of a molar amount of any zirconium ions present in the aqueous coating composition (A) to a molar amount of the trivalent bismuth cation present in the aqueous coating composition (A) (zirconium ions/trivalent bismuth cation) is equal to or smaller than 1/100, and
    a ratio of a molar amount of any aminopolycarboxylic acid present in the aqueous coating composition (A) to a molar amount of the trivalent bismuth cation present in the aqueous coating composition (A) (aminopolycarboxylic acid/trivalent bismuth cation) is equal to or smaller than 1/15.

2. The method as claimed in claim 1, wherein the aqueous coating composition (A) comprises the component (A4) in an amount of, calculated as bismuth metal and based on a total weight of the aqueous coating composition (A), in a range from 10 ppm to 20 000 ppm.

3. The method as claimed in claim 1, wherein the at least one organic monocarboxylic or polycarboxylic acid (A3) and/or anions thereof and the trivalent bismuth cation as component (A4) are present in the aqueous coating composition (A) in each case in an amount such that their stoichiometry to one another allows at least 75 mol % of the trivalent bismuth cation to be present in the form of the salt and/or complex of components (A3) and (A4).

4. The method as claimed in claim 1, wherein the at least one organic monocarboxylic or polycarboxylic acid and/or anions thereof (A3) comprises at least one carboxyl group and/or carboxylate group attached to an organic radical comprising 1-8 carbon atoms, and the organic radical is substituted optionally by at least one substituent selected from the group consisting of a hydroxyl group, an ester group, and an ether group.

5. The method as claimed in claim 1, wherein the at least one organic monocarboxylic or polycarboxylic acid and/or anions thereof (A3) is selected from the group consisting of a monocarboxylic and a polycarboxylic acid which, in α-, β-, or γ-position to the at least one carboxyl group and/or carboxylate group, comprises one or two alcoholic hydroxyl groups or ester groups or ether groups.

6. The method as claimed in claim 1, wherein the aqueous coating composition (A) is prepared by
    reacting the at least one component (A3) in the form of an aqueous solution with at least one compound comprising the trivalent bismuth cation (A4) to form a resulting aqueous solution or dispersion or suspension of the reaction product of (A3) and (A4)-comprising compound and
    mixing the resulting aqueous solution or dispersion or suspension with at least the component (A1) and optionally (A2), to give the aqueous coating composition (A).

7. The method as claimed in claim 1, wherein the ratio of the molar amount of any zirconium ions present in the aqueous coating composition (A) to the molar amount of the trivalent bismuth cation present in the aqueous coating composition (A) (zirconium ions/trivalent bismuth cation) is equal to or smaller than 1/1000.

8. The method as claimed in claim 1, wherein a ratio of a molar amount of any rare earth metal ions present in the aqueous coating composition (A) to the molar amount of the trivalent bismuth cation present in the aqueous coating composition (A) is equal to or smaller than 1/100.

9. The method as claimed in claim 1, wherein the binder (A1) is a polymeric resin which comprises at least partly protonated tertiary amino groups.

10. The method as claimed in claim 9, wherein the tertiary amino groups each independently of one another comprise at least two $C_{1-3}$ alkyl groups each substituted at least singly by a hydroxyl group.

11. The method as claimed in claim 1, wherein the voltage applied in stage (1a) is such that a deposition current density is at least 1 A/m$^2$.

12. The method as claimed in claim 1, wherein the voltage applied in stage (1a) is applied over a duration in a range from at least 5 to 300 seconds.

13. The method as claimed in claim 1, wherein the voltage applied in stage (1b) in the range from 50 to 400 V takes place in a time interval of 0 to 300 seconds after stage (1a) has been carried out, and is maintained for a time in the range from 10 to 300 seconds at a level within the stated voltage range of 50 to 400 V.

14. The method as claimed in claim 1, wherein the coating composition (A) is a cathodically depositable miniemulsion which comprises at least one cationic emulsifier.

15. The method as claimed in claim 1, wherein the method further comprises, following (1):
(2) contacting the substrate at least partly coated with the coating composition (A) with an aqueous sol-gel composition prior to curing of the coating composition (A).

16. A method for at least partly coating an electrically conductive substrate with an electrocoat material, the method comprising at least:
(1) contacting the electrically conductive substrate, connected as cathode, with an aqueous coating composition (A), wherein said contacting (1) is carried out in at least two successive stages (1a) and (1b):
(1a) at an applied voltage in a range from 1 to 50 V, which is applied over a duration of at least 5 seconds, and
(1b) at an applied voltage in a range from 50 to 400 V, with the proviso that the voltage applied in stage (1b) is greater by at least 10 V than the voltage applied in stage (1a),
and
the aqueous coating composition (A) comprises
(A1) at least one cathodically depositable binder,
(A2) optionally at least one crosslinking agent,
(A3) at least one organic monocarboxylic or polycarboxylic acid comprising no nitrogen atom(s), and/or anions thereof, and
(A4) a trivalent bismuth cation,
the aqueous coating composition (A) is prepared by
reacting at least one component (A3) in the form of an aqueous solution with at least one compound comprising the trivalent bismuth cation (A4) to form a resulting aqueous solution or dispersion or suspension of the reaction product of (A3) and (A4)-comprising compound and
mixing the resulting aqueous solution or dispersion or suspension with at least the component (A1) and optionally (A2), to give the aqueous coating composition (A),
wherein
a ratio of a molar amount of any zirconium ions present in the aqueous coating composition (A) to a molar amount of the trivalent bismuth cation present in the aqueous coating composition (A) (zirconium ions/trivalent bismuth cation) is equal to or smaller than 1/100, and
a ratio of a molar amount of any aminopolycarboxylic acid present in the aqueous coating composition (A) to a molar amount of the trivalent bismuth cation present in the aqueous coating composition (A) (aminopolycarboxylic acid/trivalent bismuth cation) is equal to or smaller than 1/15.

* * * * *

UNITED STATES PATENT AND TRADEMARK OFFICE
CERTIFICATE OF CORRECTION

PATENT NO. : 10,435,805 B2
APPLICATION NO. : 15/037365
DATED : October 8, 2019
INVENTOR(S) : Konstantinos Markou et al.

It is certified that error appears in the above-identified patent and that said Letters Patent is hereby corrected as shown below:

On the Title Page

On page 2, item (56), Foreign Patent Documents, Line 2, "2/2003" should read -- 2/2008 --.

In the Specification

In Column 2, Lines 17-18, "disclose coating composition" should read -- disclose a coating composition --.

In Column 6, Line 17, "as source" should read -- as a source --.

In Column 6, Lines 47-48, "WO 2009/11504 A1" should read -- WO 2009/115504 A1 --.

In Column 7, Lines 36-37, "has solids content" should read -- has a solid content --.

In Column 8, Line 42, "in range" should read -- in a range --.

In Column 8, Lines 48-49, "is cathodically depositable binder" should read -- is a cathodically depositable binder --.

In Column 8, Line 56, "The binder (A1) here" should read -- The binder (A1) here is --.

In Column 11, Line 13, "(A1)" should read -- (A1). --.

In Column 13, Line 5, "at temperature" should read -- at a temperature --.

In Column 16, Lines 47-48, "is cathodically depositable miniemulsion" should read -- is a cathodically depositable miniemulsion --.

Signed and Sealed this
Second Day of June, 2020

Andrei Iancu
*Director of the United States Patent and Trademark Office*

CERTIFICATE OF CORRECTION (continued)
U.S. Pat. No. 10,435,805 B2

In Column 17, Lines 3-4, "has hydroxyl group" should read -- has a hydroxyl group --.

In Column 19, Line 11, "at dip" should read -- at a dip --.

In Column 19, Line 35, "as preliminary" should read -- as a preliminary --.

In Column 19, Line 55, "in range" should read -- in a range --.

In Column 19, Line 63, "over duration" should read -- over a duration --.

In Column 21, Line 37, "in range" should read -- in a range --.

In Column 22, Line 14, "certain" should read -- a certain --.

In Column 23, Line 12, "is nonhydrolyzable" should read -- is a nonhydrolyzable --.

In Column 23, Line 18, "where therein" should read -- where $R^1$ therein --.

In Column 24, Line 9, "of bismuth" should read -- of a bismuth --.

In Column 24, Line 45, "before further coat" should read -- before a further coat --.

In Column 25, Line 30, "is preferably" should read -- is a preferably --.

In Column 26, Line 35, "9227 N" should read -- 9227 NSS --.

In Column 27, Lines 3-4, "for separately measured substance" should read -- for a separately measured substance --.

In Column 28, Line 21, "of comparative composition" should read -- of a comparative composition --.

In Column 28, Line 35, "without solids fraction" should read -- without a solids fraction --.

In Column 28, Line 39, "by high-frequency field" should read -- by a high-frequency field --.

In Column 29, Line 12, "additionally water-soluble" should read -- additionally a water-soluble --.

In Column 29, Line 16, "page 7" should read -- page 7, --.

In Column 30, Line 6, "to temperature" should read -- to a temperature --.

In Column 30, Line 31, "Production" should read -- Production of --.

In Column 31, Line 18, "i.e., voltage" should read -- i.e., a voltage --.

In Column 35, Line 29, "discloses method" should read -- discloses a method --.

In Column 37, Line 21, "in continuous line" should read -- in a continuous line --.

In Column 39, table 5a, Line 19, "14.0" should read -- 14.9 --.